(12) United States Patent
Kuang et al.

(10) Patent No.: US 9,137,224 B2
(45) Date of Patent: *Sep. 15, 2015

(54) SYSTEM AND METHOD FOR SECURE REMOTE ACCESS

(71) Applicant: INBAY TECHNOLOGIES INC., Kanata (CA)

(72) Inventors: Randy Kuang, Kanata (CA); Stanislus Kisito Xavier, Kanata (CA); Robert Frank Steklasa, Ottawa (CA); Stephen George Wilson, Ottawa (CA); He Zhu, Ottawa (CA)

(73) Assignee: INBAY TECHNOLOGIES INC., Kanata (CA)

( * ) Notice: Subject to any disclaimer, the term of this patent is extended or adjusted under 35 U.S.C. 154(b) by 2 days.

This patent is subject to a terminal disclaimer.

(21) Appl. No.: 14/231,545

(22) Filed: Mar. 31, 2014

(65) Prior Publication Data

US 2014/0237555 A1    Aug. 21, 2014

Related U.S. Application Data

(63) Continuation of application No. 13/765,049, filed on Feb. 12, 2013, now Pat. No. 8,739,252.

(60) Provisional application No. 61/599,556, filed on Feb. 16, 2012.

(51) Int. Cl.
*H04L 29/06* (2006.01)

(52) U.S. Cl.
CPC ............ *H04L 63/06* (2013.01); *H04L 63/0838* (2013.01); *H04L 63/0853* (2013.01); *H04L 63/168* (2013.01); *H04L 2463/062* (2013.01)

(58) Field of Classification Search
CPC ...................................... H04L 63/06

USPC ............................................................. 726/4
See application file for complete search history.

(56) References Cited

U.S. PATENT DOCUMENTS 7,363,494 B2 *   4/2008   Brainard et al. ............. 713/168
7,475,247 B2     1/2009   Bade et al.
(Continued)

FOREIGN PATENT DOCUMENTS

WO      2007026228     3/2007
WO    WO2008024454     2/2008

OTHER PUBLICATIONS http://www.asseco-see.com/nbv5/images/stories/presentations/NBV%20Authentication.pdf, presented during "New Banking Vision 5" from May 25-28 in Hotel "Sol Coral" Umag, Croatia.
(Continued)

*Primary Examiner* — Morshed Mehedi
(74) *Attorney, Agent, or Firm* — IP-MEX Inc.; Victoria Donnelly

(57) ABSTRACT

System, method, and apparatus for providing access to remote computing services are described. The method includes authenticating a user and a client device; establishing a connection to a server computer including: a server program executing on the server computer detecting the connection; the server program creating a blocking process on the server computer to block access of the user to a service on the connection, authorizing, using a client program executing on the client device and the server program, the user to use the service on the server computer including: terminating the blocking process, the user using the service; and the user closing the connection to the server computer. Embodiments of the present invention provide secure remote access to computing services.

22 Claims, 28 Drawing Sheets

(56) References Cited

U.S. PATENT DOCUMENTS

| | | | |
|---|---|---|---|
| 7,502,933 B2* | 3/2009 | Jakobsson et al. | 713/172 |
| 7,516,483 B2 | 4/2009 | Brennan | |
| 7,562,385 B2 | 7/2009 | Thione et al. | |
| 7,565,536 B2 | 7/2009 | Vassilev et al. | |
| 7,912,916 B2* | 3/2011 | Rakowski et al. | 709/217 |
| 7,925,556 B1* | 4/2011 | Duncan et al. | 705/35 |
| 8,201,237 B1* | 6/2012 | Doane et al. | 726/15 |
| 8,209,381 B2* | 6/2012 | Sinn et al. | 709/204 |
| 2002/0023960 A1 | 2/2002 | Knowles et al. | |
| 2002/0033418 A1 | 3/2002 | Knowles et al. | |
| 2002/0115457 A1 | 8/2002 | Koscal | |
| 2003/0037261 A1 | 2/2003 | Meffert et al. | |
| 2004/0046031 A1 | 3/2004 | Knowles et al. | |
| 2004/0128547 A1* | 7/2004 | Laidlaw et al. | 713/201 |
| 2004/0243835 A1* | 12/2004 | Terzis et al. | 713/200 |
| 2005/0198501 A1 | 9/2005 | Andreev et al. | |
| 2005/0262083 A1* | 11/2005 | Brown | 707/9 |
| 2006/0041933 A1 | 2/2006 | Yakov et al. | |
| 2006/0282662 A1* | 12/2006 | Whitcomb | 713/156 |
| 2006/0288228 A1 | 12/2006 | Botz et al. | |
| 2007/0056025 A1* | 3/2007 | Sachdeva et al. | 726/5 |
| 2007/0199054 A1 | 8/2007 | Florencio et al. | |
| 2007/0250920 A1 | 10/2007 | Lindsay | |
| 2008/0028206 A1 | 1/2008 | Sicard et al. | |
| 2008/0040783 A1* | 2/2008 | Larson et al. | 726/7 |
| 2008/0059804 A1* | 3/2008 | Shah et al. | 713/186 |
| 2008/0162925 A1 | 7/2008 | Okaya | |
| 2008/0212771 A1 | 9/2008 | Hauser | |
| 2008/0222299 A1 | 9/2008 | Boodaei | |
| 2008/0229402 A1 | 9/2008 | Smetters et al. | |
| 2009/0125993 A1 | 5/2009 | Delia et al. | |
| 2009/0132808 A1 | 5/2009 | Baentsch et al. | |
| 2009/0185687 A1* | 7/2009 | Wankmueller et al. | 380/277 |
| 2009/0198618 A1 | 8/2009 | Chan et al. | |
| 2009/0259839 A1 | 10/2009 | Jung et al. | |
| 2009/0300721 A1* | 12/2009 | Schneider | 726/3 |
| 2010/0180328 A1 | 7/2010 | Moas | |
| 2011/0296486 A1* | 12/2011 | Burch et al. | 726/1 |
| 2013/0173484 A1 | 7/2013 | Wesby | |
| 2013/0205404 A1 | 8/2013 | King | |

OTHER PUBLICATIONS

Hegt, Stan "Analysis of Current and Future Phishing Attacks on Internet Banking Services", May 2008.
Naumann, Ingo "Privacy and Security Risks When Authenticating on the Internet wit European eID Cards", Nov. 2009.
Schneier, Bruce "Schneier on Security" A blog covering security and security technology, Nov. 23, 2004.
European Payments Council Customer-to Bank Security Good Practices Guide http://europeanpaymentscouncil.eu/documents, Mar. 15, 2009.
Cavoukian, Ann "Privacy by Design . . . Take the Challenge" Aug. 2008.
Zhang, Dawei "Network Security Middleware Based on USB Key" 5th IEEE International Simposium on Embedded Computing, IEEE Computer Society (pp. 77-81), 2008.
Sestus "Virtual Token-Real Authentication" http://www.sestus.com/vt/, 2008.
Pashalidis, Andreas, Mitchell, Chris, J., "Single Sign-On Using Trusted Platforms", Royal Holloway, University of London, Egham, Surrey, TW20 0EX, United Kingdom, http://www.isg.rhul.ac.uk pp. 1-15.
Menezes, et al; Handbook of Applied Cryptography, CRC Press LLC, 1997, pp. 359-363, pp. 388-391, pp. 394-399, pp. 490-491, pp. 548-549, XP002702416, USA.

\* cited by examiner

SYSTEM AND METHOD FOR SECURE REMOTE ACCESS

REFERENCE TO RELATED APPLICATIONS

This application is a continuation application of Ser. No. 13/765,049, filed Feb. 12, 2013, which claims benefit of U.S. Provisional Application Ser. No. 61/599,556, filed Feb. 16, 2012, and the entire contents of the aforementioned applications are incorporated herein by reference.

FIELD OF THE INVENTION

The invention relates to the field of computer authentication and authorization. More particularly, the invention relates to a system and method for secure remote connection to computing services.

BACKGROUND OF THE INVENTION

Authentication is the mechanism for securely identifying users, typically through user ID and password. These credentials are vulnerable to malware attacks, such as key logging. In order to access local resources on a computer, conventional authentication methods employing user ID (Identity Document) and password are adequate. When a remote service is activated, it is unprotected and open to hacking.

Accordingly, it would be beneficial to provide an improved approach for providing a secure access to remote computing services, which would avoid or mitigate the shortcomings of the existing prior art.

SUMMARY OF THE INVENTION

There is an object of the present invention to provide a system, method and apparatus for secure remote connection to computing services.

According to one aspect of the present invention there is provided a method including:
  authenticating a user and a client device;
  establishing a connection to a server computer including:
    a server program executing on the server computer detecting the connection; and
    the server program creating a blocking process on the server computer to block access of the user to a service on the connection,
  authorizing the user to access the service on the server computer, using a client program executing on the client device and the server program, including terminating the blocking process on the server computer;
  using the service; and
  closing the connection to the server computer.
Beneficially, the authenticating may include:
  establishing a secure connection from the client device to the server computer;
  sending an invitation over the secure connection including a URL (Uniform Resource Locator) from a server program to the client device;
  downloading a client program to the client device from a location provided by the URL; initiating execution of the client program on the client device;
  entering a predetermined user PIN (personal identification number) to the client program;
  sending a client device ID (identification number) and the predetermined user PIN from the client program to the server program over the secure connection;
  the server program generating a random number to provide a secret key;
  the server program encrypting the secret key using the user PIN and the client device ID as keys;
  the server program sending the encrypted secret key to the client program over the secure connection;
  the client program decrypting the encrypted secret key using the user PIN and the client device ID as keys;
  the user entering user account credentials into the client program; or
  the client program closing the secure connection.
Alternatively, authenticating may include:
  the server program encrypting user account credentials with the secret key;
  the server program sending the encrypted user account credentials to the client program over the secure connection;
  the client program decrypting the encrypted user account credentials; or
  the client program closing the secure connection.
Beneficially, establishing a connection may include:
  establishing a remote desktop connection from the client device to the server computer;
  establishing a remote desktop connection from a client terminal to the server computer;
  establishing a secure shell (SSH) connection from the client device to the server computer;
  the user entering a personal identification number (PIN) into the client program; or
  comparing the entered PIN a predetermined user PIN.
Furthermore, the server computer creating the blocking process may include:
  the server program creating a blocking window on a desktop of the server computer;
  the server program creating a modal dialog window;
  executing a blocking program in the secure shell.
Beneficially, authorizing the user, using the client program and the server program, to use a service on the server computer may include:
  the client program creating a client OTA (One Time Authorization) code;
  the server program creating a server OTA code;
  the client program sending the client OTA code to the server program; or
  the server program comparing the server OTA code with the client OTA code.
Furthermore, the client program creating the client OTA code may include:
  the client program combining a secret key with dynamic connection information using a one-way function;
  and the server program creating the server OTA code comprises:
  the server program combining the secret key with the dynamic connection information using the one-way function.
Additionally, authorizing may include:
  the server program providing a quick response (QR) code including dynamic connection information in a blocking window on a desktop of the server computer; and
  the client program receiving the dynamic connection information from the QR code;
  the client program copying the client OTA code to a shared clipboard;
  the server program detecting the client OTA code on the shared clipboard; or
  the server program comprises sending the client OTA code on a secure channel;

the client program copying the client OTA code to a clipboard; or the user pasting the client OTA code into a secure shell executing a blocking program.

Beneficially, the user using the service may include:

the client program automatically signing into the service in a remote desktop window on the client device using user account credentials; or the user signing out of the service in the remote desktop window on the client device.

Alternatively, the user using the service may include:

the user signing into the service in a remote desktop window on the client device using user account credentials.

According to another aspect of the present invention, there is provided a system including a client device configured to execute a client program and a server computer configured to execute a server program. The client program and server programs are configured to:

authenticating a user and the client device;

establishing a connection to the server computer including:

the server program executing on the server computer detecting the connection; and the server program creating a blocking process on the server computer to block access of the user to a service on the connection, authorizing the user to access the service on the server computer, using the client program executing on the client device and the server program, including terminating the blocking process on the server computer;

using the service; and closing the connection to the server computer.

Beneficially, authenticating may include:

establishing a secure connection from the client device to the server computer;

sending an invitation over the secure connection including a URL (Uniform Resource Locator) from a server program to the client device;

downloading a client program to the client device from a location provided by the URL;

initiating execution of the client program on the client device;

entering a predetermined user PIN (personal identification number) to the client program; sending a client device ID (identification number) and the predetermined user PIN from the client program to the server program over the secure connection;

the server program generating a random number to provide a secret key; the server program encrypting the secret key using the user PIN and the client device ID as keys;

the server program sending the encrypted secret key to the client program over the secure connection;

the client program decrypting the encrypted secret key using the user PIN and the client device ID as keys;

the user entering user account credentials into the client program; or the client program closing the secure connection.

Alternatively, authenticating may include:

the server program encrypting user account credentials with the secret key;

the server program sending the encrypted user account credentials to the client program over the secure connection;

the client program decrypting the encrypted user account credentials; or the client program closing the secure connection.

Beneficially, establishing a connection may include:

establishing a remote desktop connection from the client device to the server computer;

establishing a remote desktop connection from a client terminal to the server computer;

establishing a secure shell (SSH) connection from the client device to the server computer;

the user entering a personal identification number (PIN) into the client program; or comparing the entered PIN a predetermined user PIN.

Furthermore, the server computer creating the blocking process may include:

the server program creating a blocking window on a desktop of the server computer;

the server program creating a modal dialog window;

executing a blocking program in the secure shell.

Beneficially, authorizing the user, using the client program and the server program, to use a service on the server computer may include:

the client program creating a client OTA (One Time Authorization) code;

the server program creating a server OTA code;

the client program sending the client OTA code to the server program; or the server program comparing the server OTA code with the client OTA code.

Furthermore, the client program creating the client OTA code may include:

the client program combining a secret key with dynamic connection information using a one-way function;

and the server program creating the server OTA code comprises:

the server program combining the secret key with the dynamic connection information using the one-way function.

Additionally, authorizing may include:

the server program providing a quick response (QR) code including dynamic connection information in a blocking window on a desktop of the server computer; and the client program receiving the dynamic connection information from the QR code;

the client program copying the client OTA code to a shared clipboard;

the server program detecting the client OTA code on the shared clipboard; or the server program comprises sending the client OTA code on a secure channel;

the client program copying the client OTA code to a clipboard; or the user pasting the client OTA code into a secure shell executing a blocking program.

Beneficially, the user using the service may include:

the client program automatically signing into the service in a remote desktop window on the client device using user account credentials; or the user signing out of the service in the remote desktop window on the client device.

Alternatively, the user using the service may include:

the user signing into the service in a remote desktop window on the client device using user account credentials.

According to still another aspect of the present invention there is provided an apparatus for implementing the client device in the system as described herein above.

According to yet another aspect of the present invention there is provided another apparatus for implementing the server computer in the system as described herein above.

Thus, an improved system, method and apparatus for secure remote connection to computing services have been provided.

BRIEF DESCRIPTION OF THE DRAWINGS

Further features and advantages of the invention will be apparent from the following description of the embodiment, which is described by way of example only and with reference to the accompanying drawings, in which.

Figure 1:
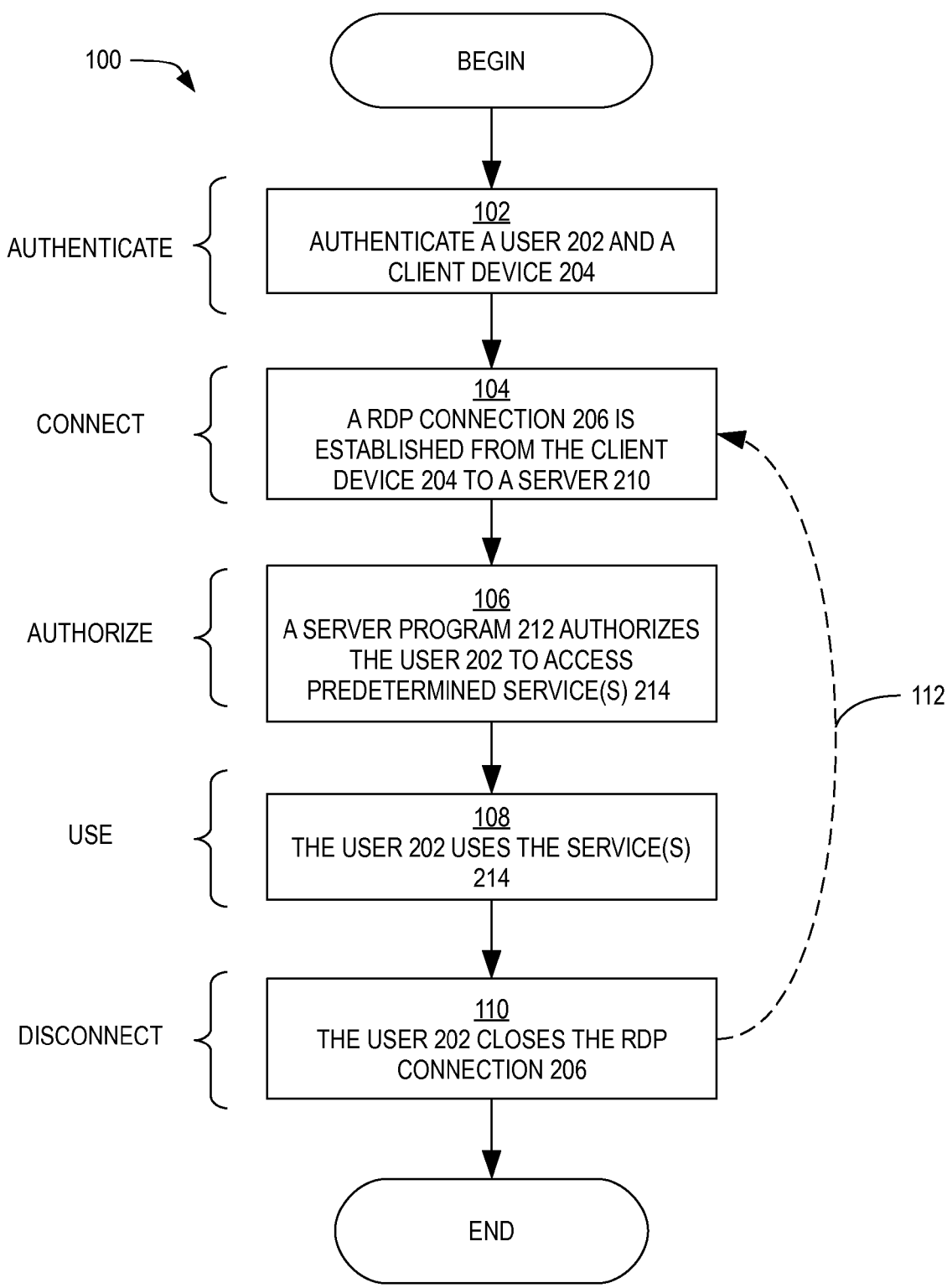
FIG. 1 shows a top level flowchart of a method in accordance with a first embodiment of the present invention.

The accompanying drawings are included to provide a further understanding of the present invention and are incorporated in and constitute a part of this specification. The drawings illustrate some embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF EMBODIMENTS OF THE INVENTION

Embodiments of the present invention address deficiencies in conventional authentication and authorization processes when remote connections are used to access computing services. The process of authorization is distinct from that of authentication. Whereas authentication is the process of verifying that "you are who you say you are", authorization is the process of verifying that "you are permitted to do what you are trying to do". Authorization thus presupposes authentication.

Various embodiments of the present invention will be described in general using summary flowcharts and block diagrams with each general description followed by detailed flowcharts and block diagrams.

Figure 2:
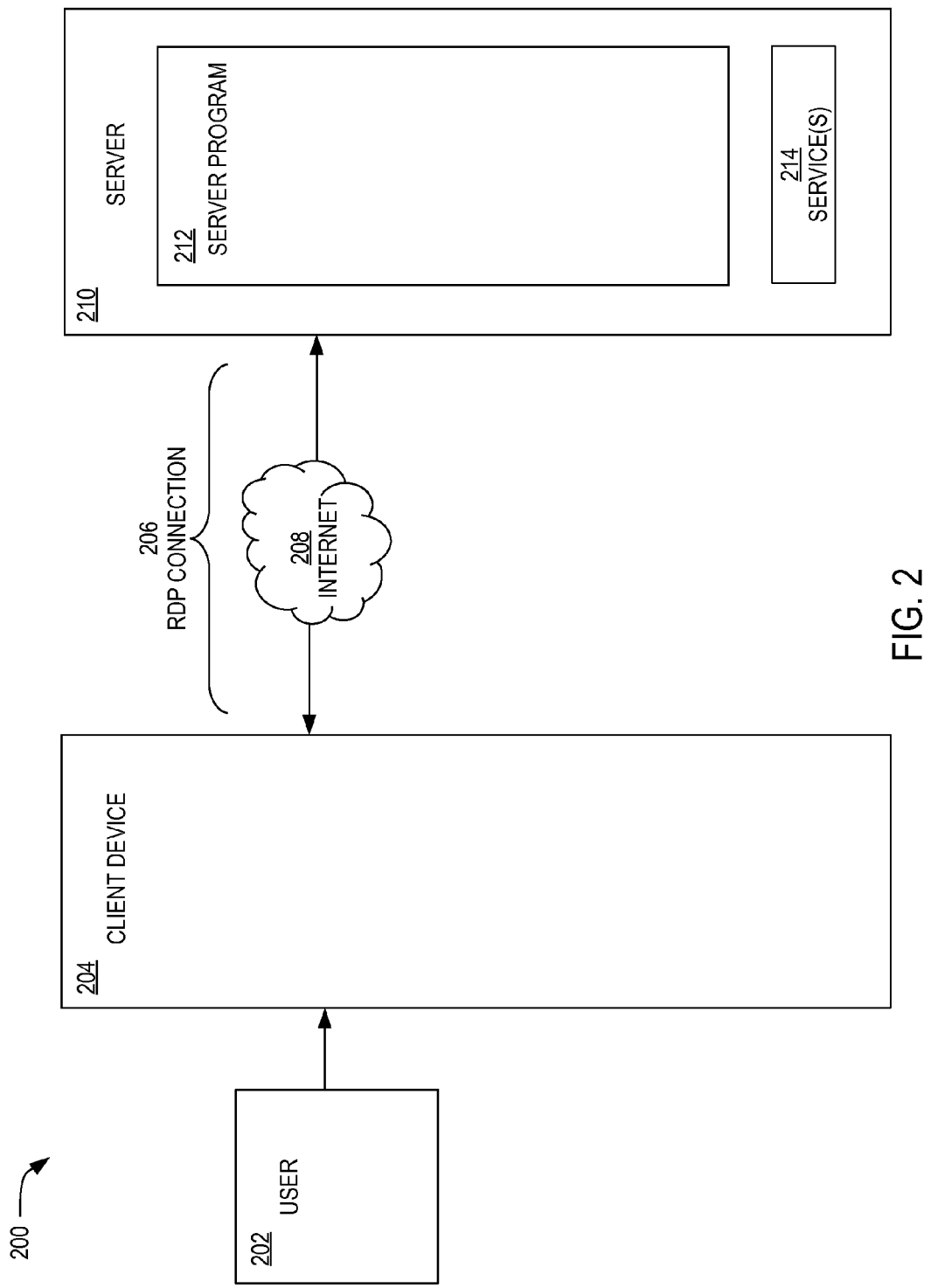
FIG. 2 shows an overview block diagram of a system in accordance with the first embodiment of the present invention with elements referenced in the flowchart of FIG. 1.

Referring to FIG. 1 there is shown a summary flowchart of a method 100 of a first embodiment of the present invention; and in FIG. 2 there is shown a block diagram 200 of a system including elements referred to in the flowchart 100 in FIG. 1.

Firstly, a user 202 and a user device 204, or a client device 204, the two terms to be used interchangeably in this application, are authenticated 102. The user device 204 may be, for example, a personal computer, tablet computer, a smart phone, or any other device suitable for the user 202 to remotely access desired services.

Next, a remote desktop connection 206 is established 104 from the client device 204 to a server computer 210. The remote desktop connection 206 may be made through a network such as, for example, the Internet 208, a LAN (local area network), WAN (wide area network), or the like. The remote desktop connection 206 may be based on conventional protocols such as RDP (Remote Desktop Protocol) or VNC (Virtual Network Computing) protocols or the like. The server computer 210 may be, for example, be a computing system within a bank, on-line retailer or any other like institution offering one or more predetermined on-line service(s) 214. In general, the server computer 210 may be, for example, a computer having a processor configured to execute instructions stared in a memory (not shown). For clarity, the predetermined services 214 comprise computer readable instructions stored in the memory of the server computer 210. As well, the server program comprises computer readable instructions stored in the memory of the server computer 210.

All modules or blocks shown inside the client device 204 and the server computer 210 comprise computer readable instructions stored in a non-transitory computer readable storage medium, such as computer memory, CD-ROM, DVD or similar, for retrieval and/or execution by a processor.

Next, a server program 212 executing on the server computer 210 authorizes 106 the user 202 to access and use the predetermined services 214 on the server computer 210 that are available to the authenticated user 202 and authenticated client device 204.

Next, the user 202 uses 108 the predetermined services 214 in a conventional manner.

When the user 202 is finished using the predetermined services 214, the user 202 closes 110 the RDP connection 206. Optionally, the user 202 may repeat 112 the connection 104 to closing 110 processes as many times as desired without repeating the authentication 102 process.

The authentication 102 process will now be described in more detail with reference to the flowchart shown in FIGS. 3A and 3B; and the block diagrams shown in FIGS. 4A and 4B. For clarity, a layout guide 302 shows an arrangement of FIGS. 3A and 3B.

First, the client device 204 establishes 304 a secure connection 402 with the server computer 210. The secure connection 402 may be based on any secure protocol known in the art such as SSL (Secure Sockets Layer), TLS (Transport Layer Security), or the like.

Then server program 212 sends 306 an invitation in including a URL (Uniform Resource Location) for downloading 312 a client program 408 from, for example, a download site on the Internet 208. The invitation may optionally include a registration code (not shown). The invitation 404 may be sent via email or any other conventional message system. The client program 408, after downloading 312, comprises computer readable instructions stored in a memory (not shown) of the client device 204.

Having received the invitation 404 the user decides 308 to accept the invitation 404 or not. If the user 202 does not accept the invitation 404 the authentication process 102 fails and the authentication process stops 310.

If the user 202 accepts the invitation, the user 202 downloads 312 the client program 408 using the provided URL 406 to the client device 204 and initiates execution of the client program 408 on the client device 204.

The user 202 enters 314 a predetermined user PIN (Personal Identification Number) 410 to the client program 408. The predetermined PIN 410 may be, for example, a secret number known only to the user 202, or biometric information entered using conventional hardware (not shown) included in the client device 204.

The client program 408 sends 316 the user PIN 410, a client device ID 413, and, optionally, the registration code 404 to the server program 212. The client device ID 413 is a copy made by the client program 408 when the client program 408 is initially executed 312 of a static dev ID 412 unique to the client device 404 that is determined at time of manufacture. Beneficially, at any time after the authentication process 102, the client program 408 may compare the copy of the client device ID 413 with the static device ID 412 for increased security.

The server program 212 generates a random number for providing 318 a secret key 414. The random number may be generated by any process known in the art.

The server program 212 encrypts 320 the secret key 414 using the user PIN 410 and the client device ID 413 as keys to provide an encrypted secret key 416. The secret key 414 may be encrypted, for example, using any suitable algorithm known in the art such as AES (Advanced Encryption Standard) or the like.

The server program 212 sends 322 the encrypted secret key 416 to the client program 408 over the secure connection 402.

The client program 408 decrypts 324 the encrypted secret key 416 using the user PIN 410 and the client device id 413 as keys.

The user 202 enters 326 user account credentials 418 into the client program 408.

Optionally, the server program 212 encrypts 328 the user account credentials 418 with the secret key 414. The server program 212 sends 330 the encrypted user account credentials (not shown) to the client program 408. The client program 408 decrypts 332 the encrypted user account credentials.

The client program 408 closes 324 the secure connection 402.

Figure 4A:
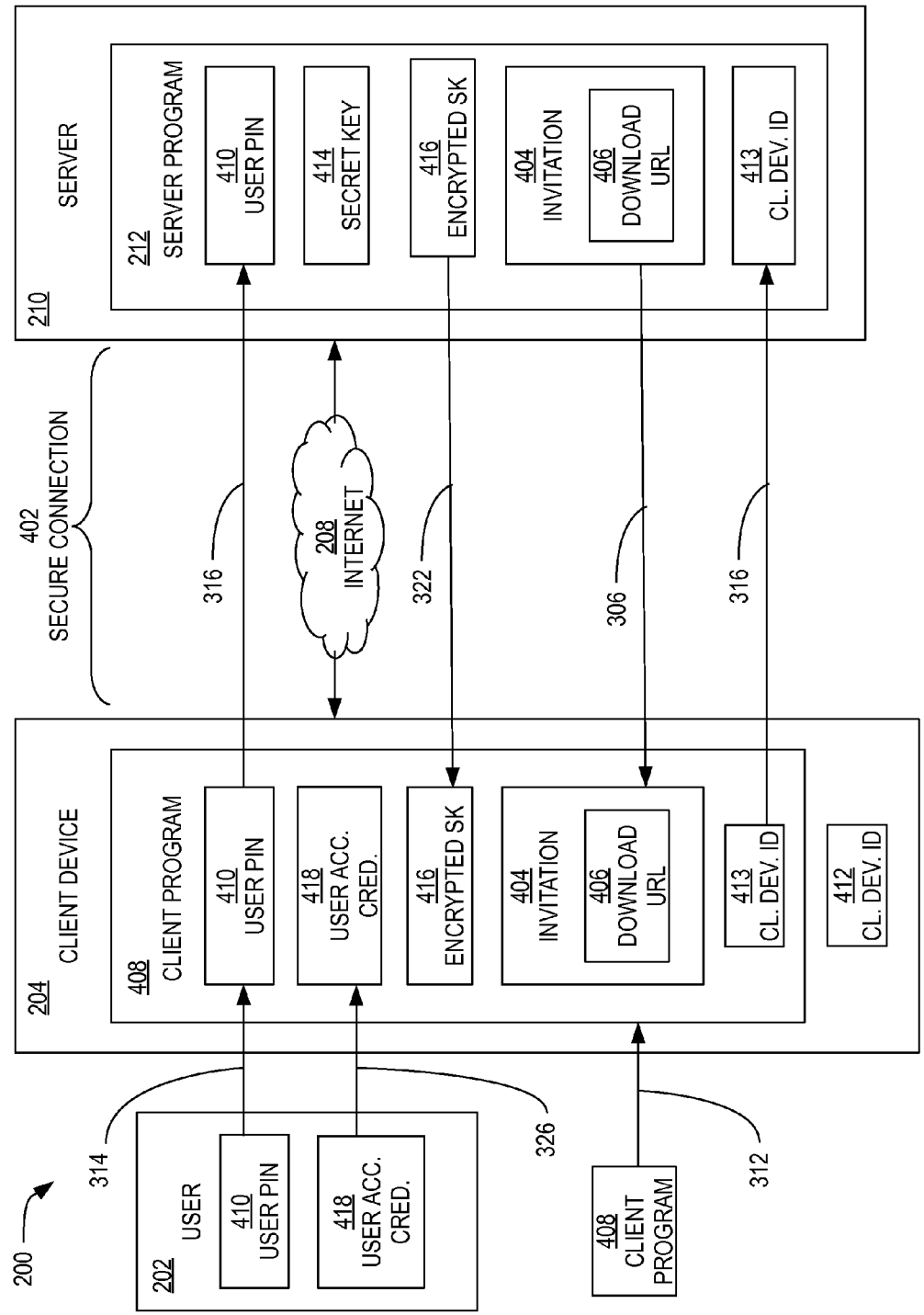
FIGS. 4A and 4B show detailed block diagrams of the system shown in FIG. 2 with elements referenced in the flowcharts of FIGS. 3A and 3B.
Figure 4B:
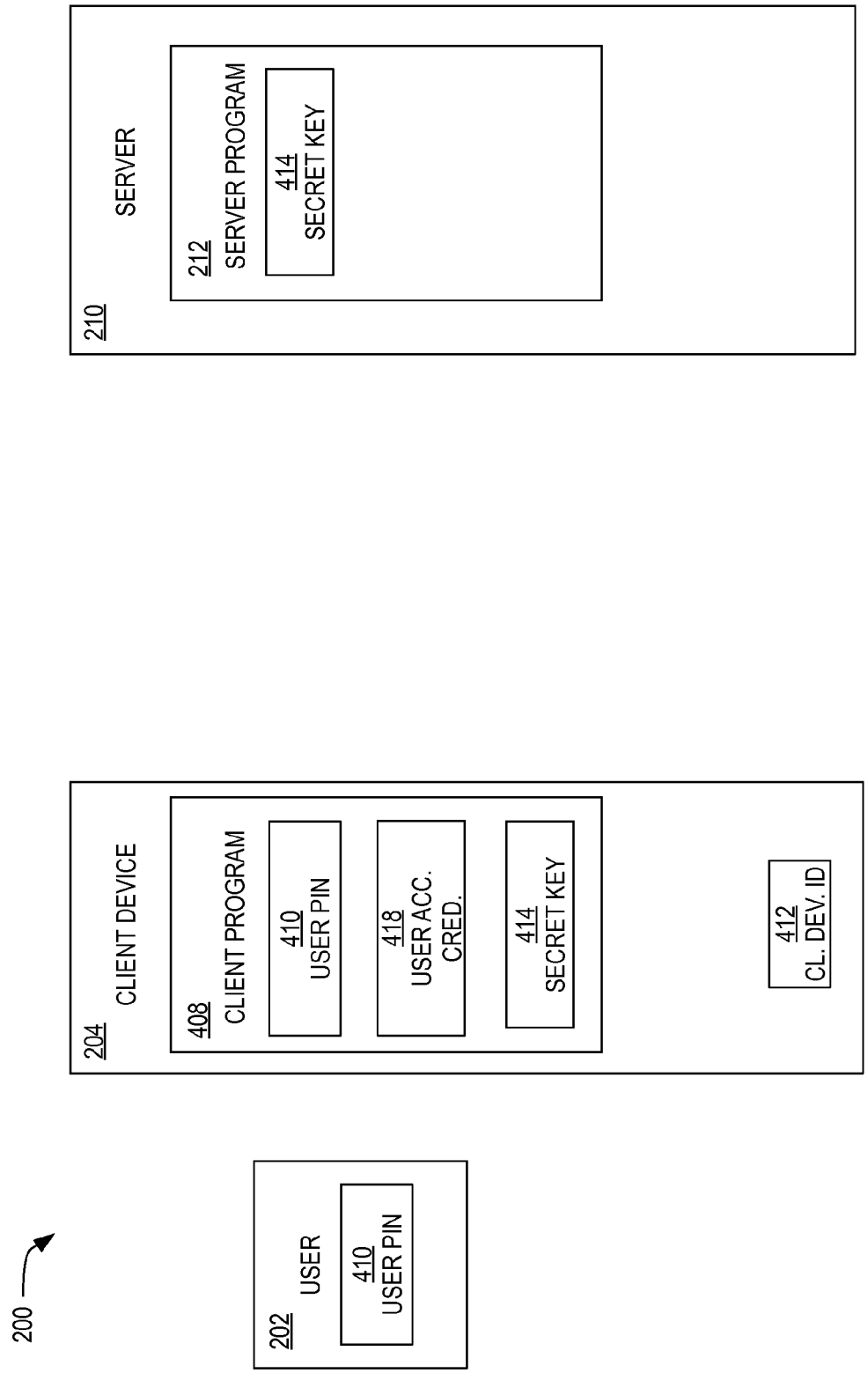

FIG. 4B shows the system 200 after completion of the authentication process 102. The user 202 and the client device 204 are now authenticated since the user 202 and the client device share the predetermined user PIN; and the client program 408 and server program 212 share the secret key 414. After the authentication process 102 the client device 204 is what is known in the art as a trusted device.

Figure 5:
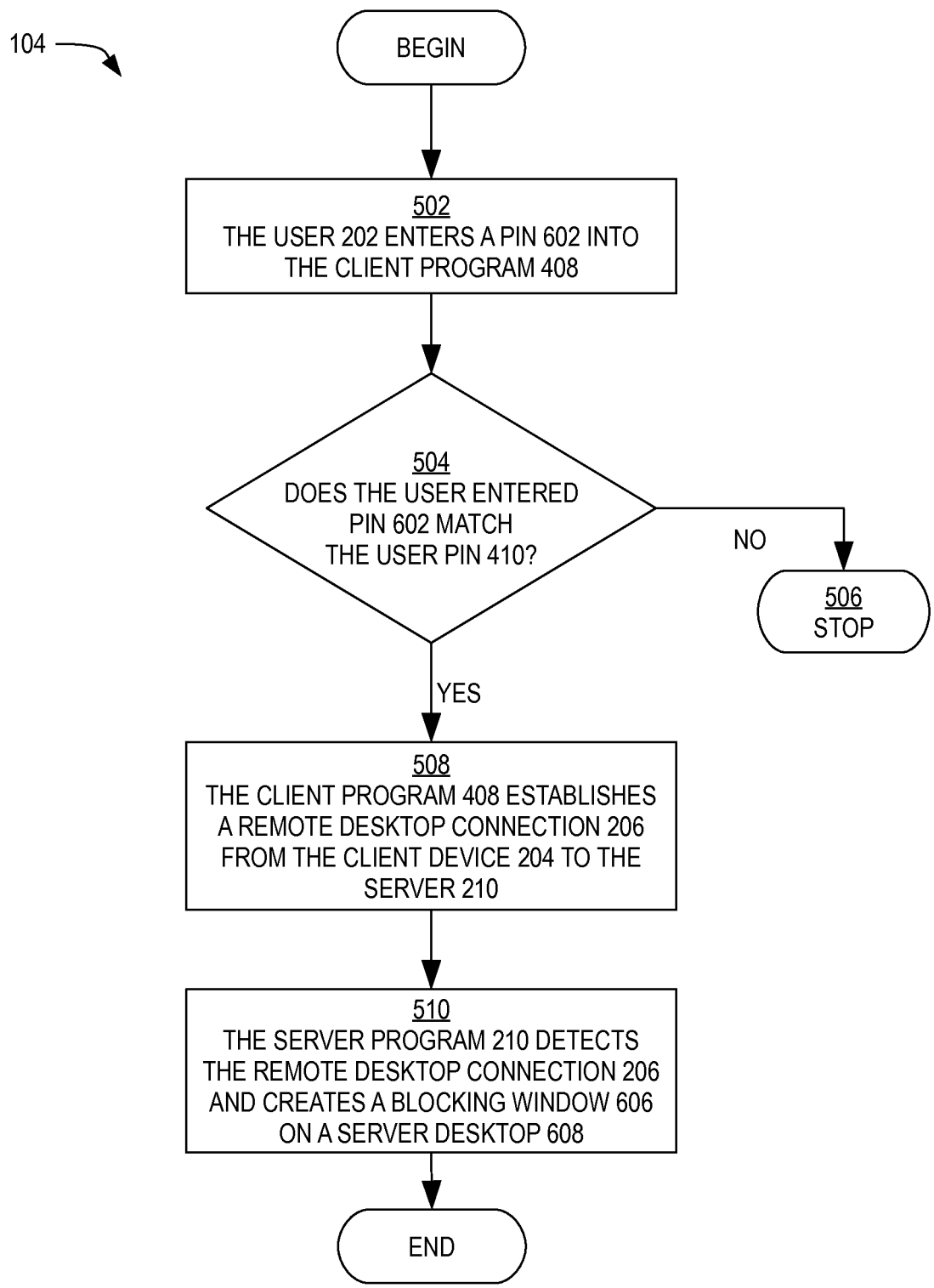
FIG. 5 shows a flowchart of a method of a connection process in the flowchart shown in FIG. 1.
Figure 6:
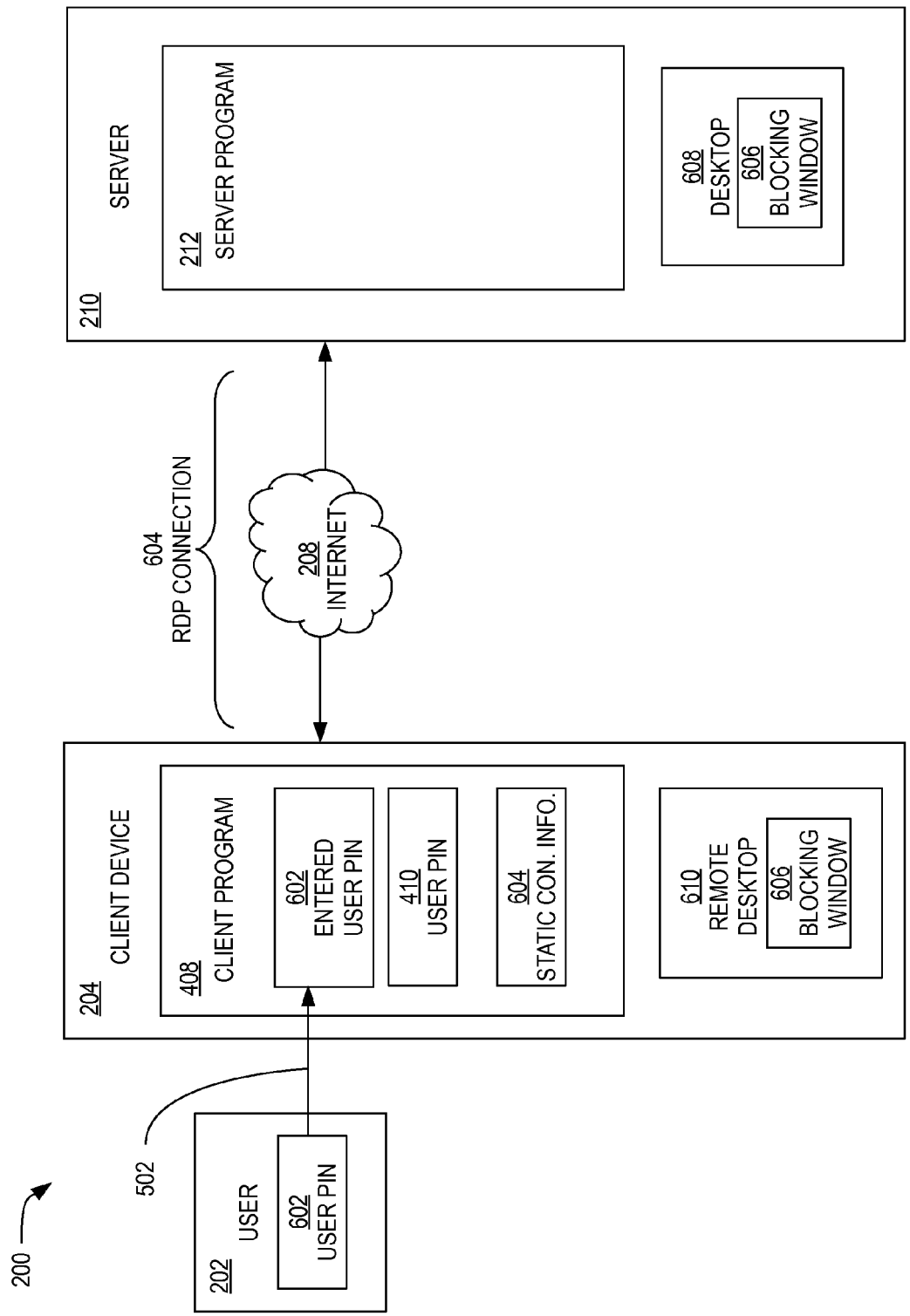
FIG. 6 shows a detailed block diagram of the system shown in FIG. 2 with elements referenced in the flowchart of FIG. 5.

FIG. 5 shows a flowchart of a method of the connection process 104 in the flowchart shown in FIG. 1; and FIG. 6 shows a detailed block diagram of the system 200 shown in FIG. 2 with elements referenced in the flowchart of FIG. 5.

The user 202 enters 502 a PIN 602 into the client program 408. The entered user PIN 602 is compared 504 with the predetermined user PIN 410. If the entered user PIN 602 and the predetermined user PIN 410 do no match, the connection process 104 is stopped 506. If the entered user PIN 602 and the predetermined user PIN 410 do match then the connection process 104 continues.

The client program 408 establishes 508 a remote desktop connection 206 from the client device 204 to the server computer 210. The remote desktop connection may be a RDP (Remote Desktop Protocol) or VNC (Virtual Network Computing) connection or the like. The server program 212 detects 510 the remote desktop connection 206 and creates a blocking window 606 on a server desktop 608. The blocking window may be for example a modal dialog box. Such a dialog box, as understood in the art, blocks all other user access until certain inputs or actions are provided. In this case the action is the authorization of the user 202 as describe herein below. In general, any type of process or program that blocks the user 202 from accessing any services on the server computer 210 until the user 204 is authorized is within the scope of the invention.

Figure 7:
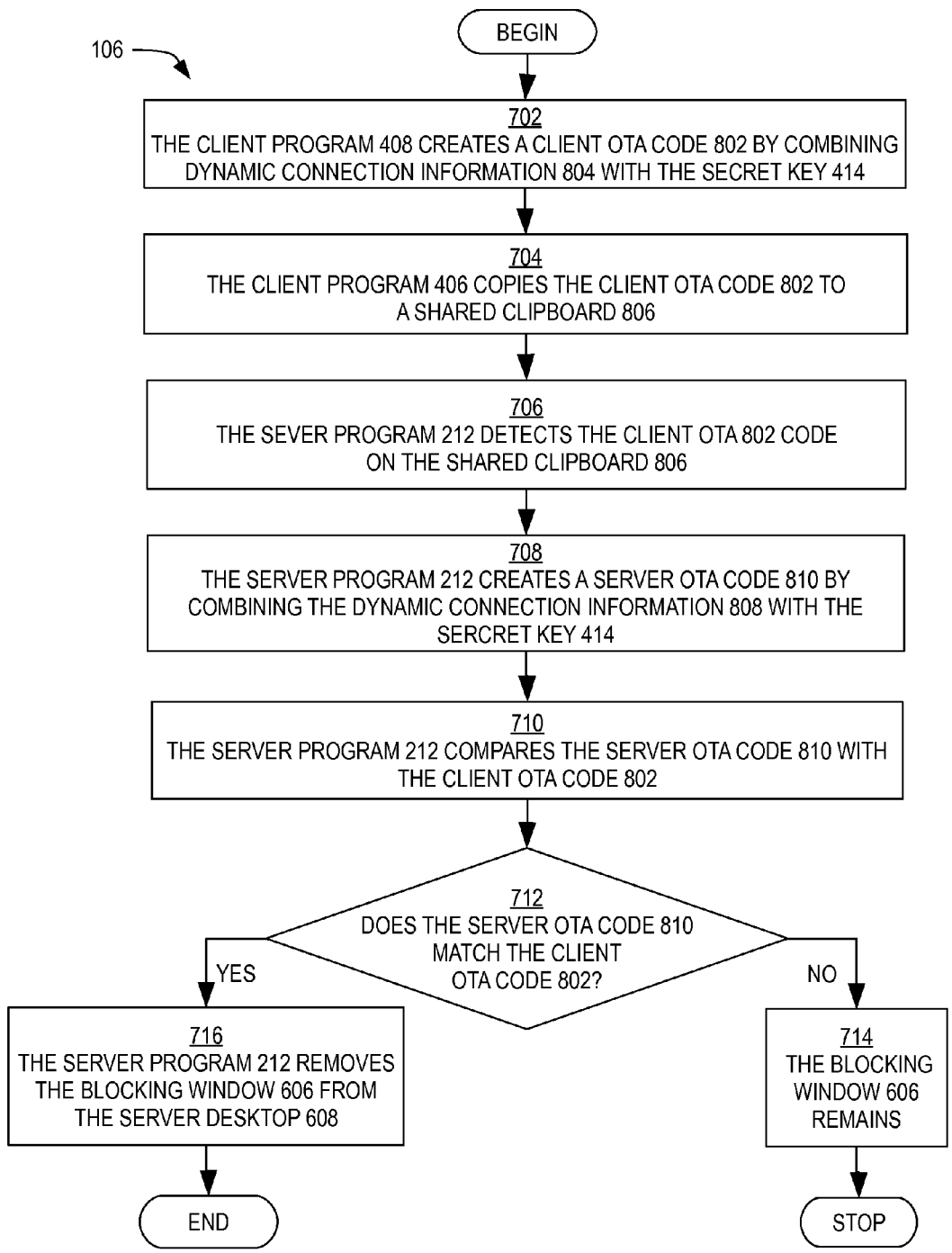
FIG. 7 shows a flowchart of a method of an authorization process in the flowchart shown in FIG. 1.
Figure 8:
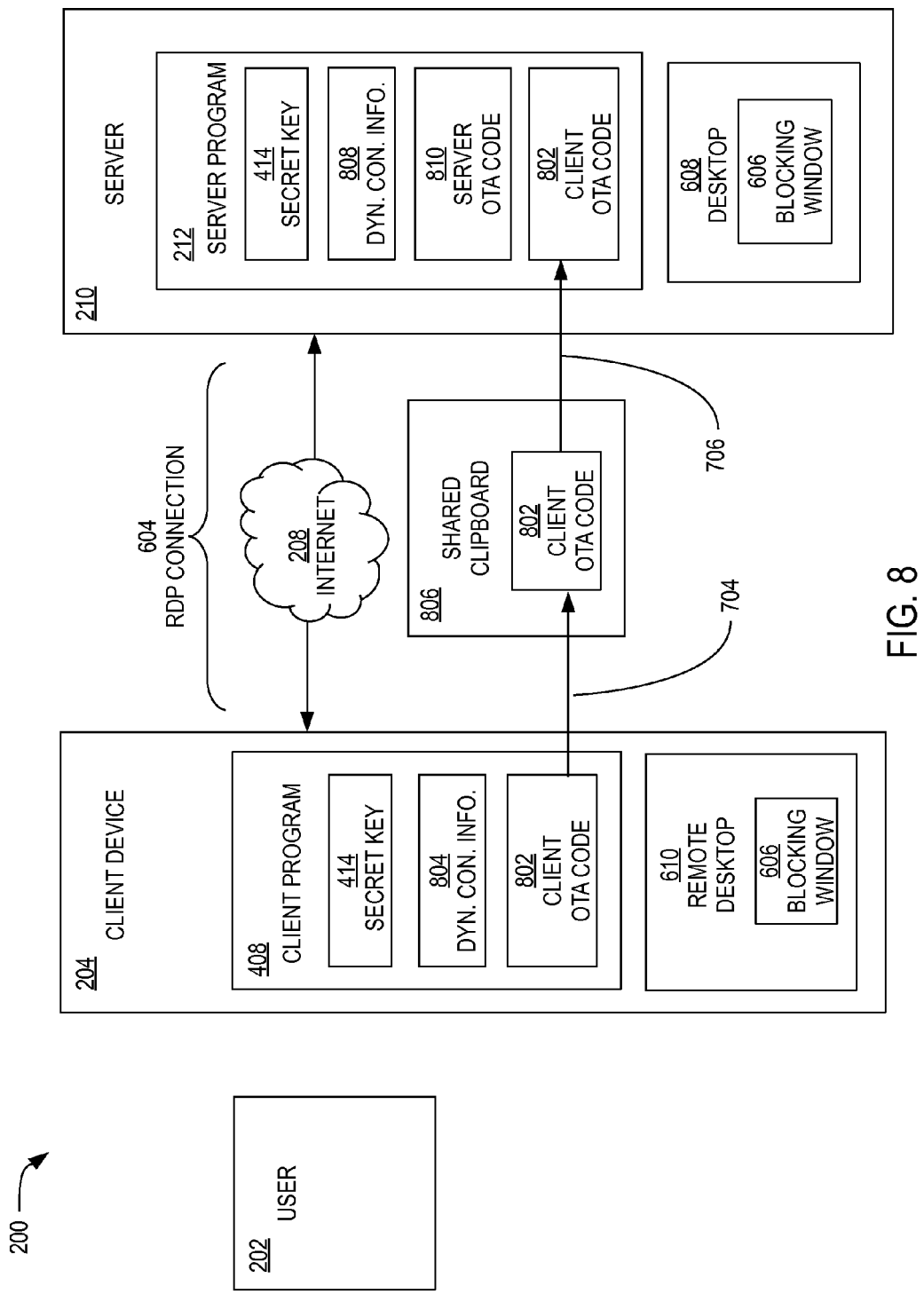
FIG. 8 shows a detailed block diagram of the system shown in FIG. 2 with elements referenced in the flowchart of FIG. 7.

FIG. 7 shows a flowchart of a method of the authorization process 106 in the flowchart shown in FIG. 1 and FIG. 8 shows a detailed block diagram of the system 200 shown in FIG. 2 with elements referenced in the flowchart of FIG. 7.

First, the client program 408 creates 702 a client OTA code 802 by combining dynamic connection information 804 with the secret key 414. The dynamic connection information 804 may be, for example, an IP (Internet Protocol) address, port number, time stamp or any combination thereof. The dynamic connection information 804, secret key 414, and dynamic connection information 804 are combined using a one-way function such as exclusive OR, or any other one-way function known in the art.

Next, the client program 408 copies 704 the client OTA code 802 to a shared clipboard 806.

Next, the server program 212 detects 706 the client OTA code on the shared clipboard 806. The server program 212 creates 708 a server OTA code 810 by combing the dynamic connection information 808 with the secret key 414. The dynamic connection information 808 may be, for example, an IP (Internet Protocol) address, port number, time stamp or any combination thereof. The dynamic connection information 804 is the same as the dynamic connection information 808 on the server computer 210. The dynamic connection information 808 and secret key 414 are combined using the same one-way function as in creating the client OTA code 802 described herein above.

Next, the server program 212 compares 710 the server OTA code 810 with the client OTA code 802. If the server OTA code 810 does not match the client OTA code 802, then the blocking window 606 remains 714 and the authorization process 106 is stopped.

If the server OTA code 810 does match the client OTA code 802, then the server program 212 removes 716 blocking window 606 from the server desktop 608.

Figure 9:
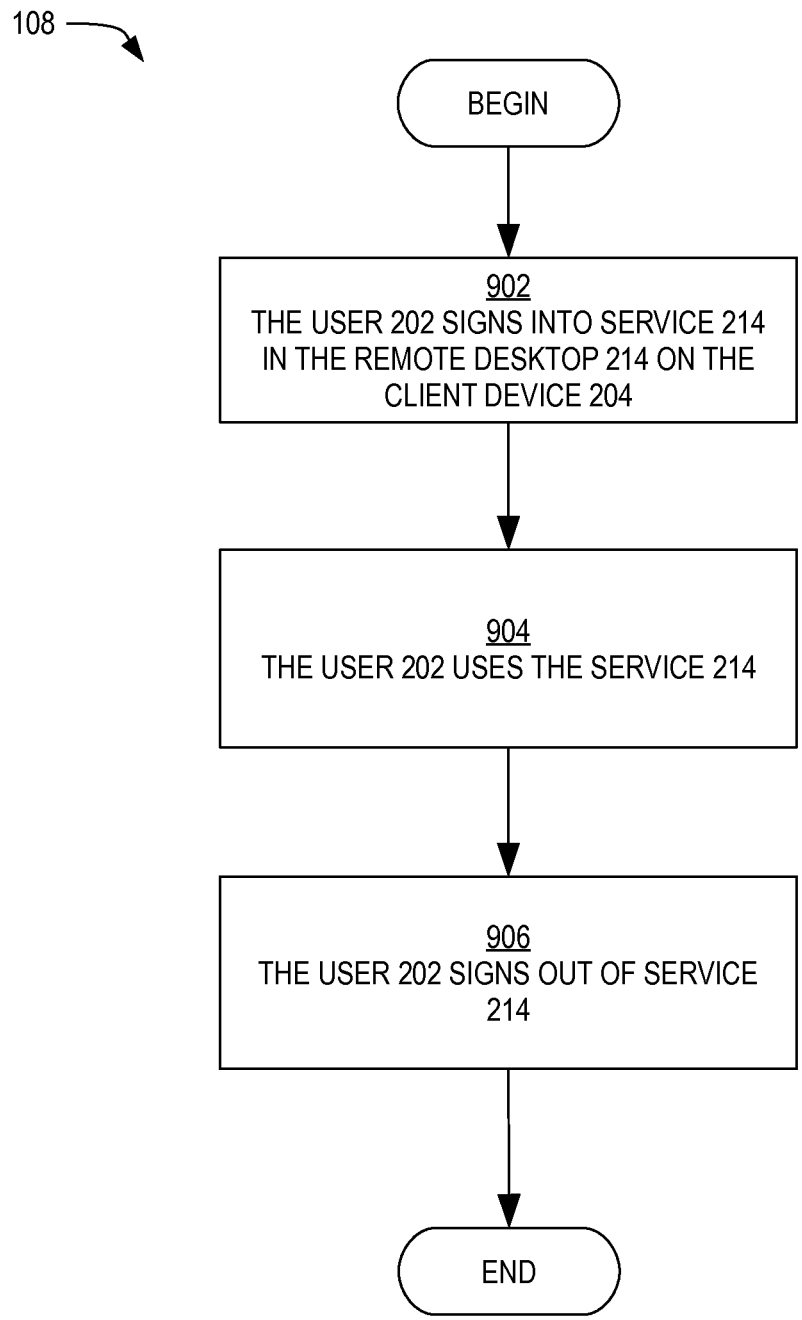
FIG. 9 shows a flowchart of a method of a Using Services process in the flowchart shown in FIG. 1.
Figure 10:
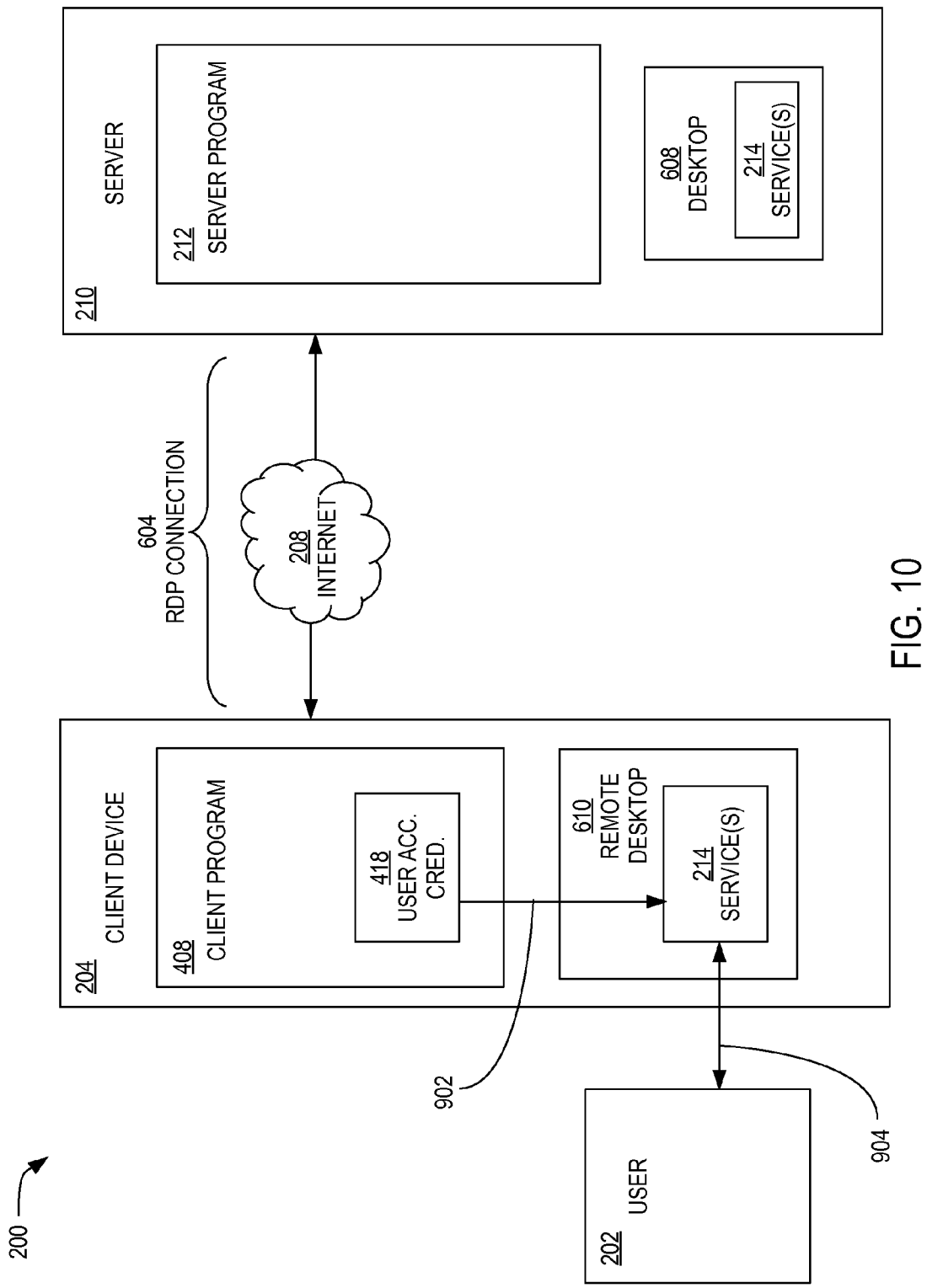
FIG. 10 shows a detailed block diagram of the system shown in FIG. 2 with elements referenced in the flowchart of FIG. 9.

FIG. 9 shows a flowchart of a method of the Using Services 108 process in the flowchart shown in FIG. 1; and FIG. 10 shows a detailed block diagram of the system 200 shown in FIG. 2 with elements referenced in the flowchart of FIG. 9.

First, preferably the client program 408 automatically signs into 902 the service 214 using the user account credentials 418, or alternatively the user 202 manually signs into the service 214. Then the user 202 uses 904 the service 214 in a conventional manner from the client device 204 such as bank accounts or online retail services. After the user 202 is finished, the user 202 signs out 906 of service 214.

Lastly, the user closes 110 the RDP connection 206 in a conventional manner.

Figure 11:
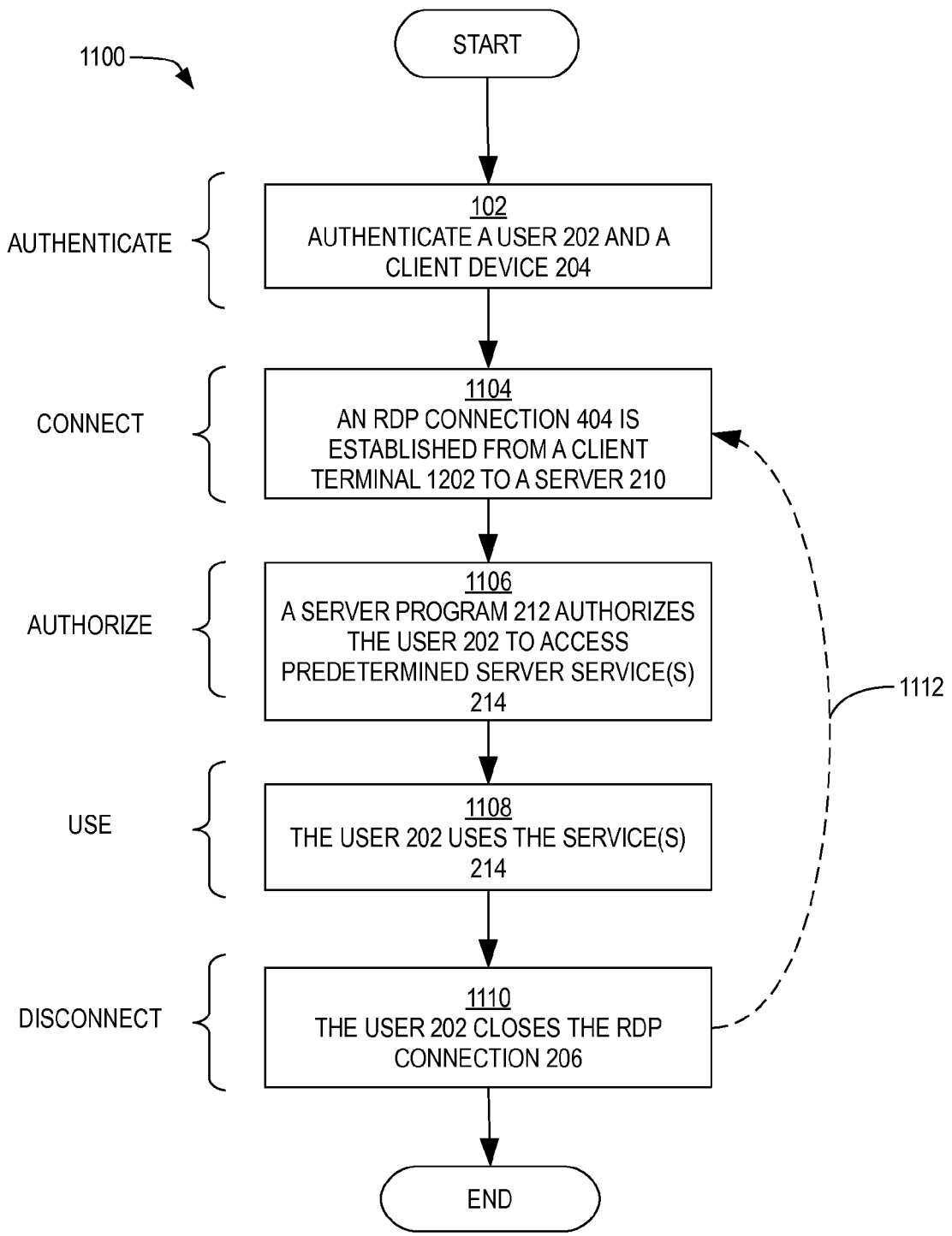
FIG. 11 shows a top level flowchart of a method in accordance with a second embodiment of the present invention.
Figure 12:
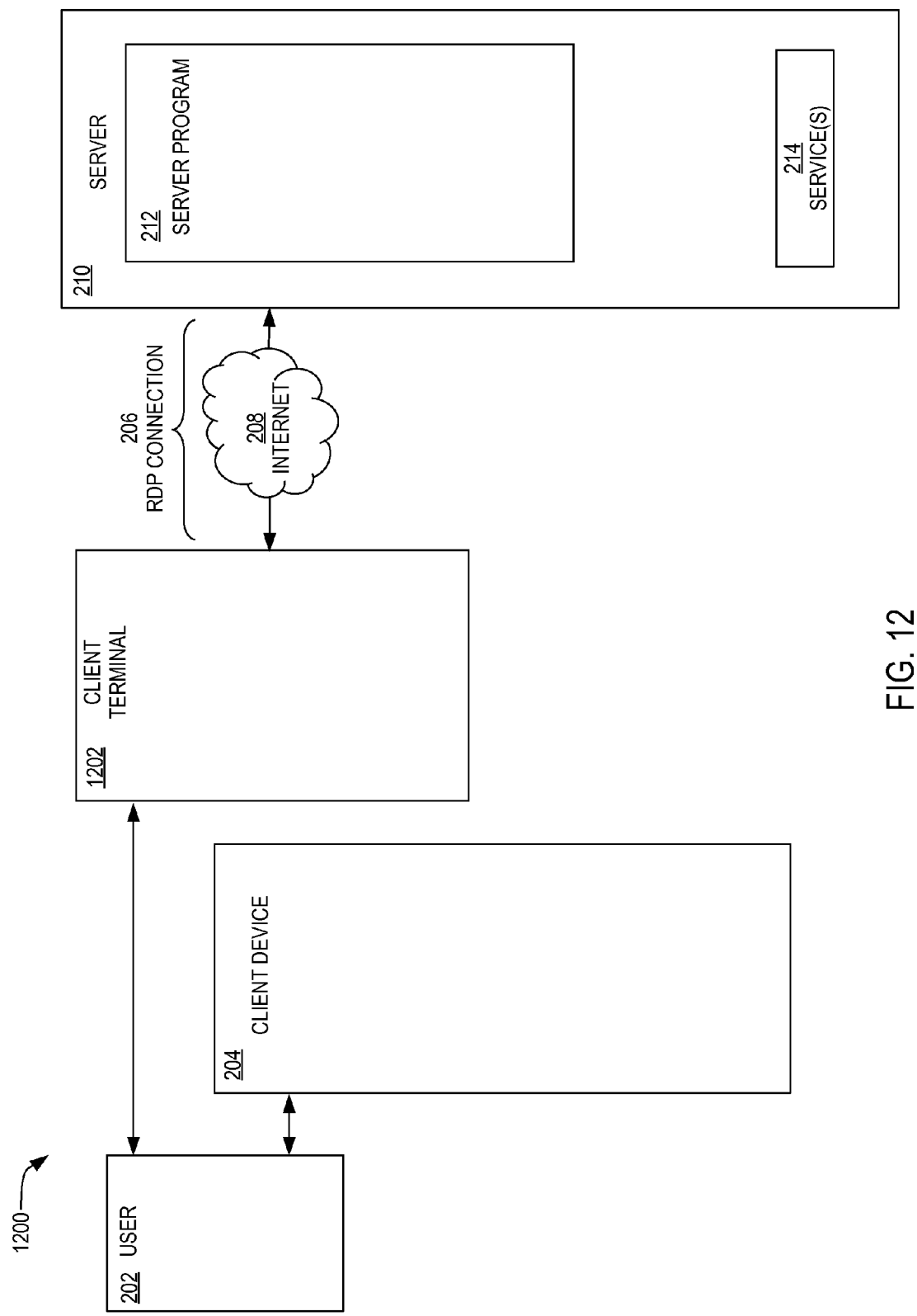
FIG. 12 shows an overview block diagram of a system in accordance with the second embodiment of the present invention with elements referenced in the flowchart of FIG. 11.

Referring now to FIG. 11, there is shown a summary flowchart of a method 1110 in accordance with a second embodiment of the present invention; and FIG. 12 shows an overview block diagram of a system 1200 in accordance with the second embodiment of the present invention with elements referenced in the flowchart of FIG. 11.

Firstly, a user 202 and a user device 204 are authenticated 102. The authentication process 102 of the second embodiment is identical to the authentication process of the first embodiment 102 as described herein above. The user device 204 is preferably mobile device such as a smart phone, PDA (Personal Digital Assistant) or the like having a camera with QR (Quick Response) code reading capability as is common in the art.

Next, a remote desktop connection 206 is established 104 from a client terminal 1202 to the server computer 210.

Next, a server program 212 authorizes 1106 the user 202 from the client terminal 1202 to access and use the predetermined services 214 on the server computer 210 that are available to the authenticated user 202 and authenticated client device 204. The client terminal may be, for example, a public shared computer in a cafe or library not previously authenticated.

Next, the user 202 uses 108 the predetermined services 214 in a conventional manner.

When the user 202 is finished using the predetermined services 214, the user 202 closes 110 the RDP connection 206. Optionally, the user 202 may repeat 1112 the connection 104 to closing 110 processes as many times as desired without repeating the authentication 102 process.

Figure 13:
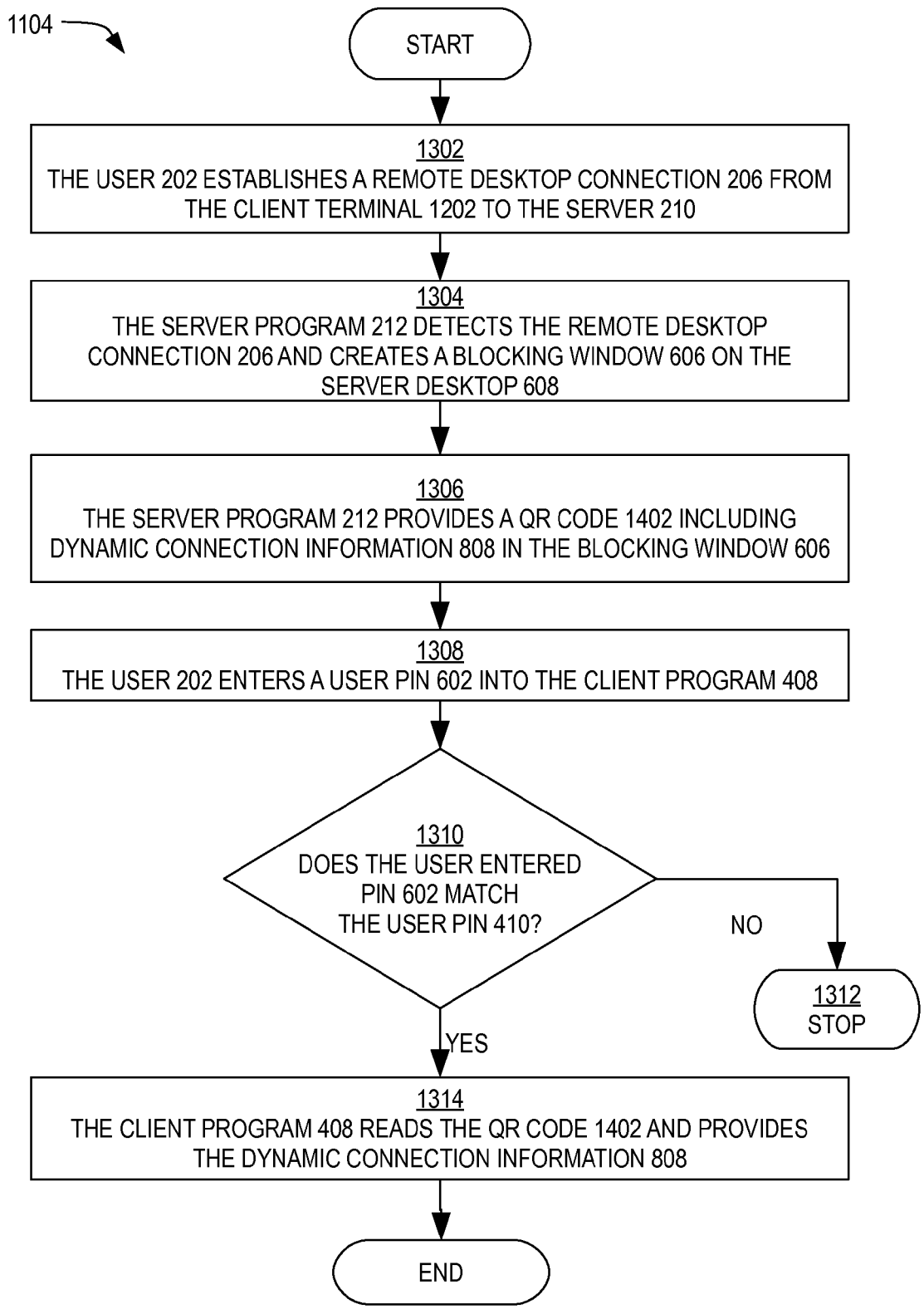
FIG. 13 shows a flowchart of a method of a connection process in the flowchart shown in FIG. 11.
Figure 14:
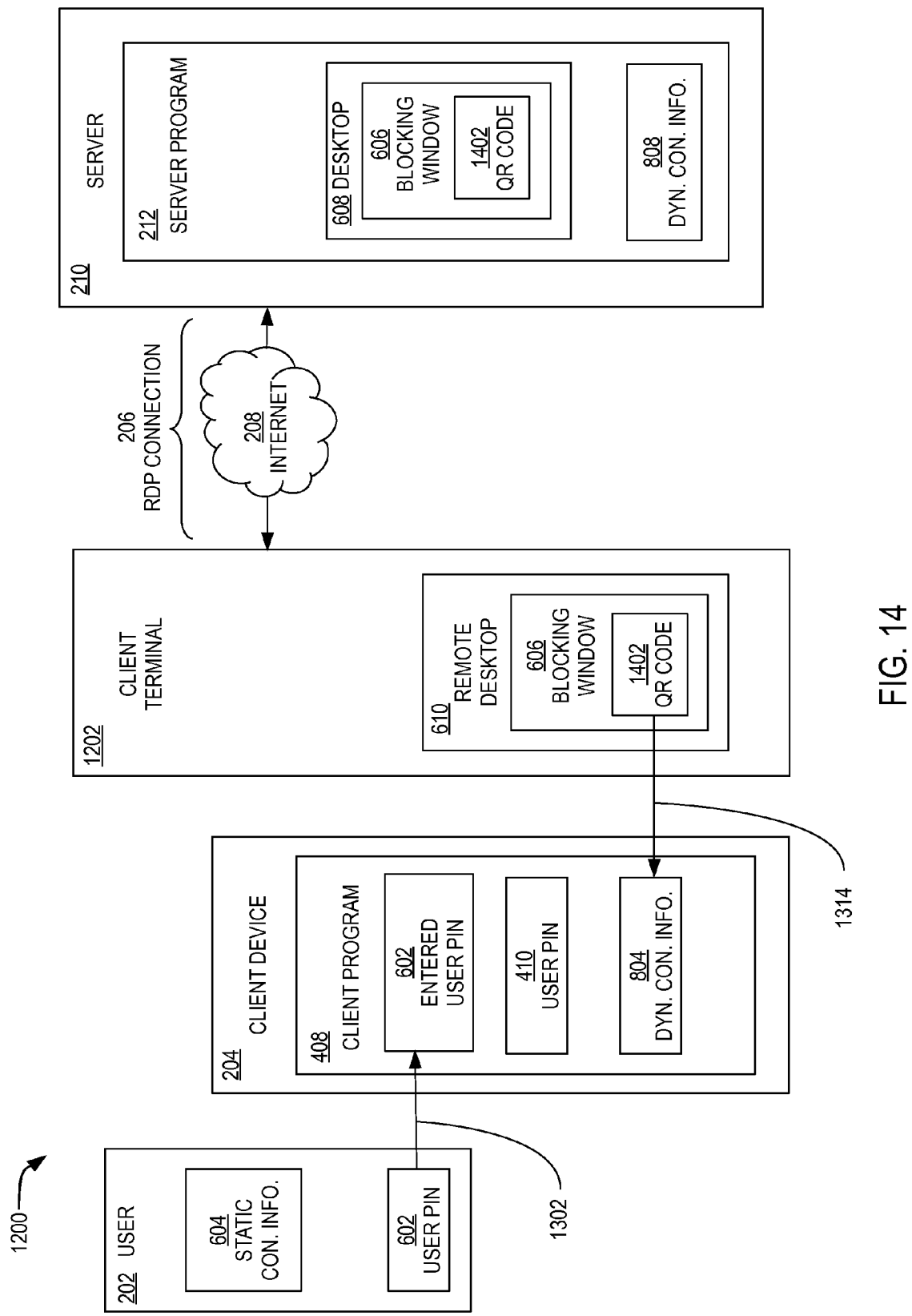
FIG. 14 shows a detailed block diagram of the system shown in FIG. 2 with elements referenced in the flowchart of FIG. 13.

FIG. 13 shows a flowchart of a method of the connection process 1100 in the flowchart shown in FIG. 11; and FIG. 14 shows a detailed block diagram of the system shown in FIG. 2 with elements referenced in the flowchart of FIG. 13.

First, the user 202 establishes 1302 a remote desktop connection 206 from the client terminal 1202 to the server computer 210.

Next, the server program 212 detects 1304 the remote desktop connection 206 and creates a blocking window 606 on the server desktop 608.

Next, the server program 212 provides 1306 a QR code 1402 including the dynamic connection information 808 in the blocking window 606.

Next, the user 202 enters 1308 a user pin 602 into the client program 408. The entered PIN 602 is compared 1310 with the predetermined user PIN 410. If the entered user PIN 602 and the predetermined user PIN 410 do no match, the connection process 1104 is stopped 1312. If the entered user PIN 602 and the predetermined user PIN 410 do match then the connection process 1104 continues.

Next, the user 202 holds the client device 204 in a position for the client program 408 to read 1314 the QR code 1402 and provide the dynamic connection information 808 to the client program 408.

Figure 15:
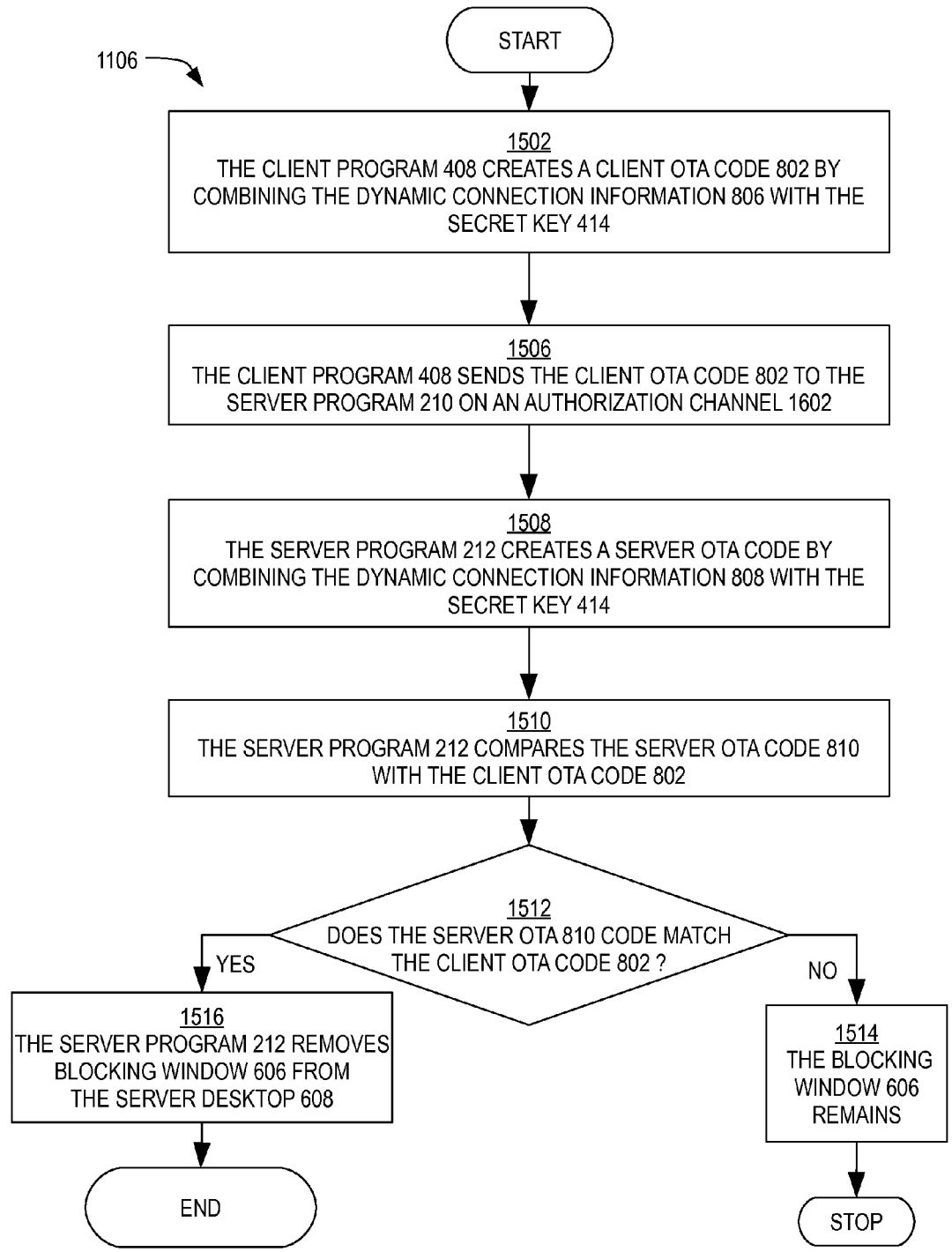
FIG. 15 shows a flowchart of a method of an authorization process in the flowchart shown in FIG. 11.
Figure 16:
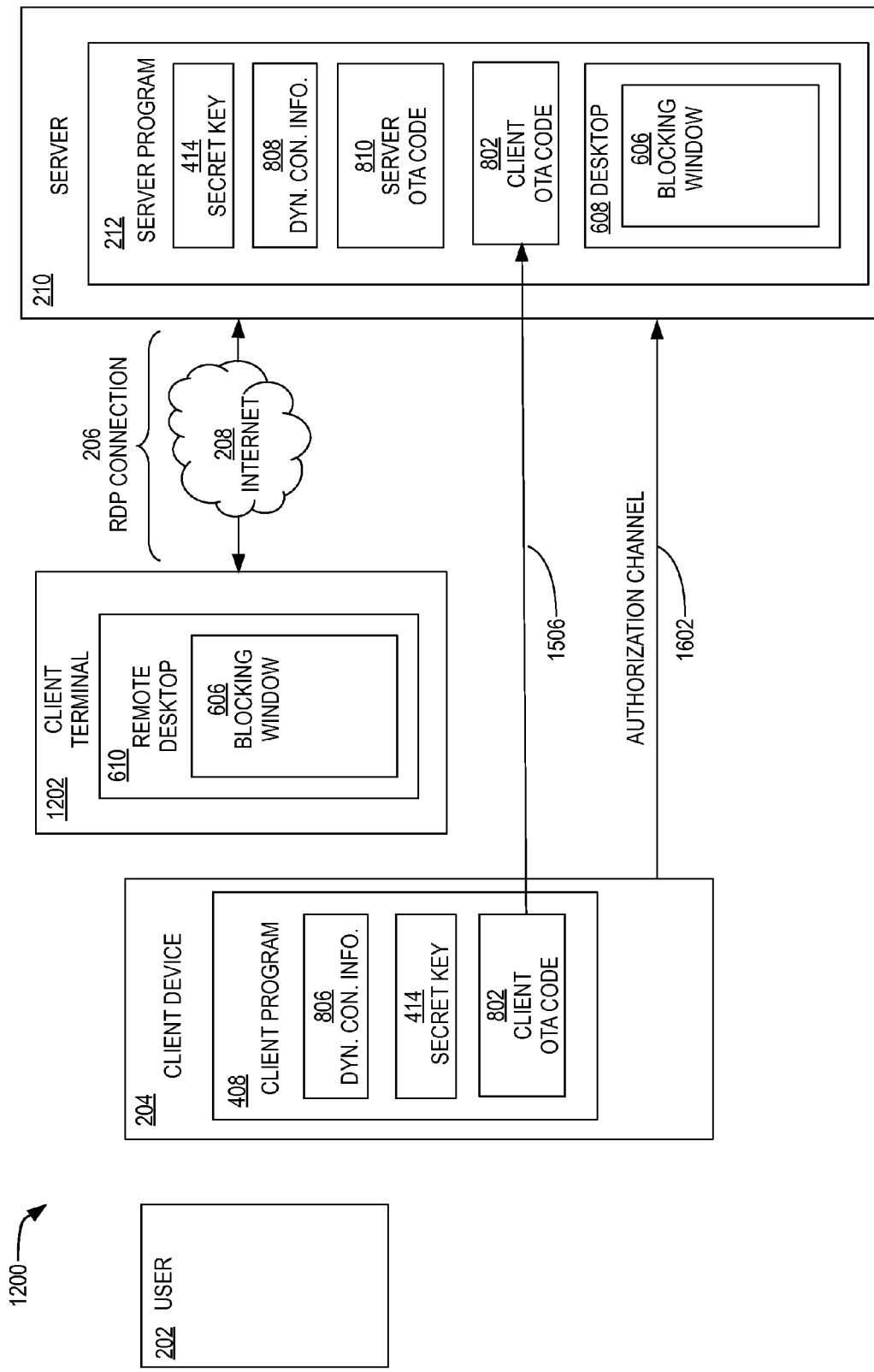
FIG. 16 shows a detailed block diagram of the system shown in FIG. 12 with elements referenced in the flowchart of FIG. 15.

FIG. 15 shows a flowchart of a method of the authorization process 1104 in the flowchart shown in FIG. 11; and FIG. 16 shows a detailed block diagram of the system 1200 shown in FIG. 12 with elements referenced in the flowchart of FIG. 15.

First, the client program 408 creates 1502 a client OTA code 802 by combining the dynamic connection information 806 with the secret key 414.

Then the client program 408 sends 1506 the client OTA code 802 to the server program 212 on an authorization channel 1602. The authorization channel 1602 may be based on any secure protocol known in the art such as SSL (Secure Sockets Layer), TLS (Transport Layer Security), or the like.

Then the server program 212 creates 1508 a server OTA code by combing the dynamic connection information 808 with the secret key 414.

Then the server program 212 compares 1510 the server OTA code 810 with the client OTA code 802. If the server OTA code 810 does not match the client OTA code 802, then the blocking window 606 remains 1514 and the authorization process 106 is stopped.

If the server OTA code 810 does match the client OTA code 802, then the server program 212 removes 516 blocking window 606 from the server desktop 608.

Figure 17:
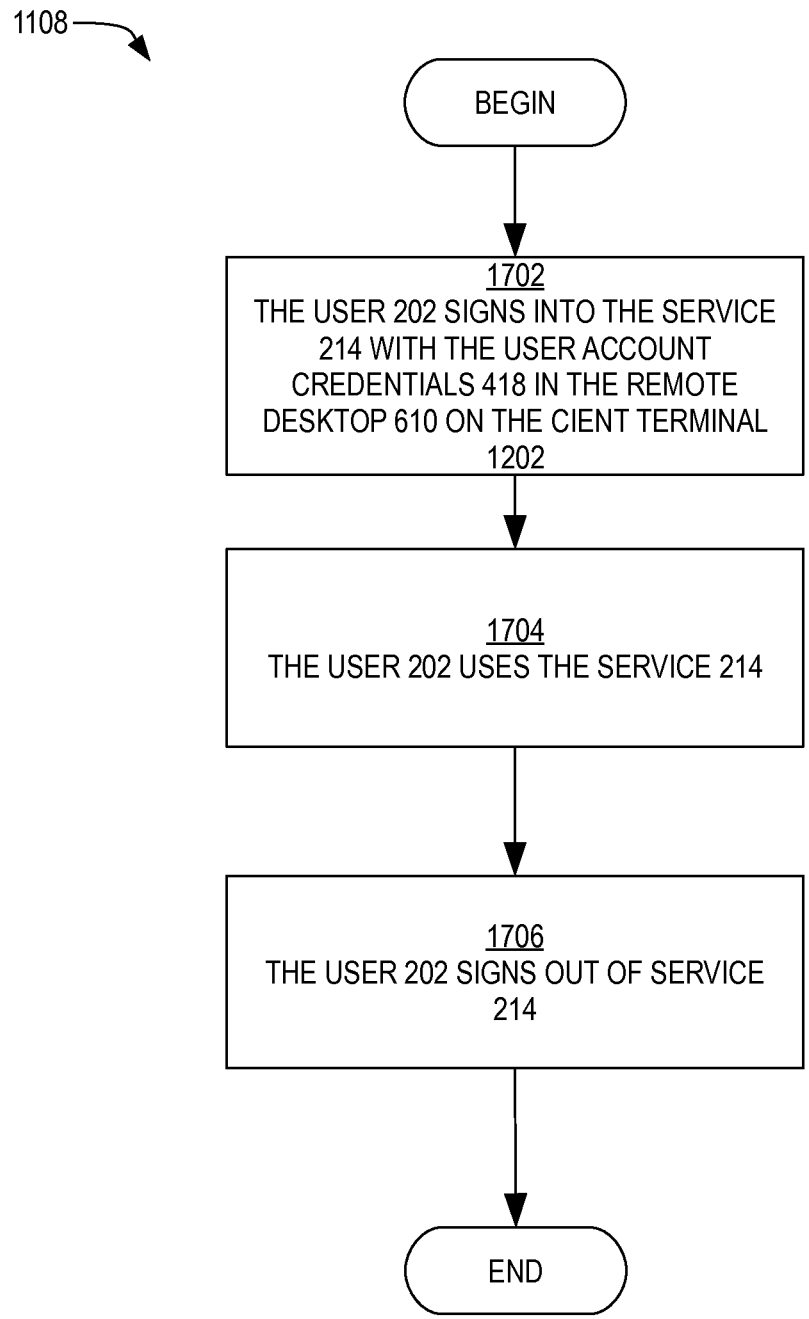
FIG. 17 shows a flowchart of a method of a Using Services process in the flowchart shown in FIG. 11.
Figure 18:
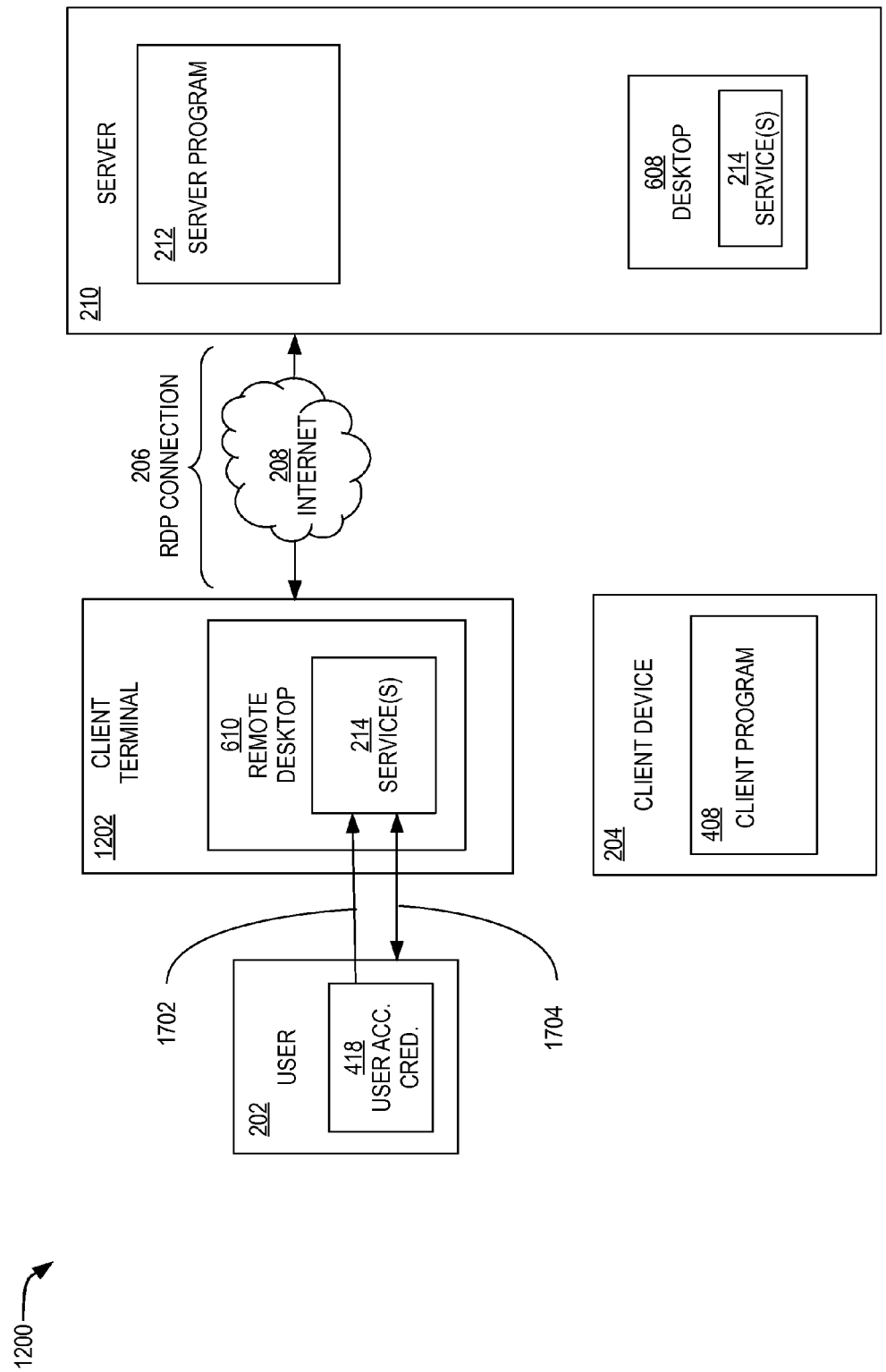
FIG. 18 shows a detailed block diagram of the system shown in FIG. 12 with elements referenced in the flowchart of FIG. 17.

FIG. 17 shows a flowchart of a method of a Using Services process in the flowchart shown in FIG. 11; and FIG. 18 shows a detailed block diagram of the system shown in FIG. 12 with elements referenced in the flowchart of FIG. 17.

The user 202 signs 1702 into the service 214 with the user account credentials 418 in the remote desktop 610 on the client terminal 1202. The user 202 uses 704 the service 214 in a conventional manner from the client terminal 1202. The user 202 signs out 1706 of service 214

Lastly, the user 202 closes 1110 the RDP connection 206 in a conventional manner.

Figure 19:
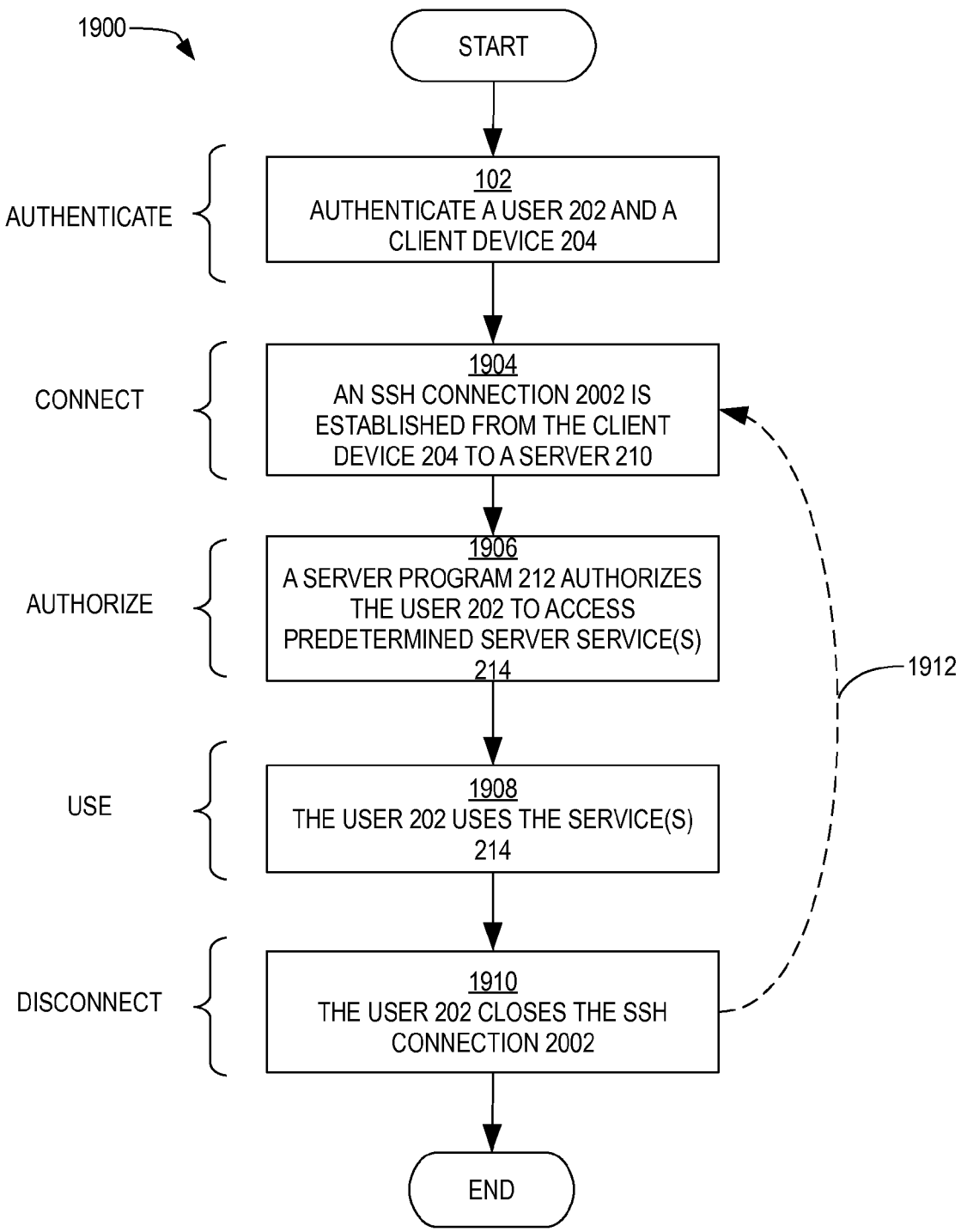
FIG. 19 shows a top level flowchart of a method in accordance with a third embodiment of the present invention.
Figure 20:
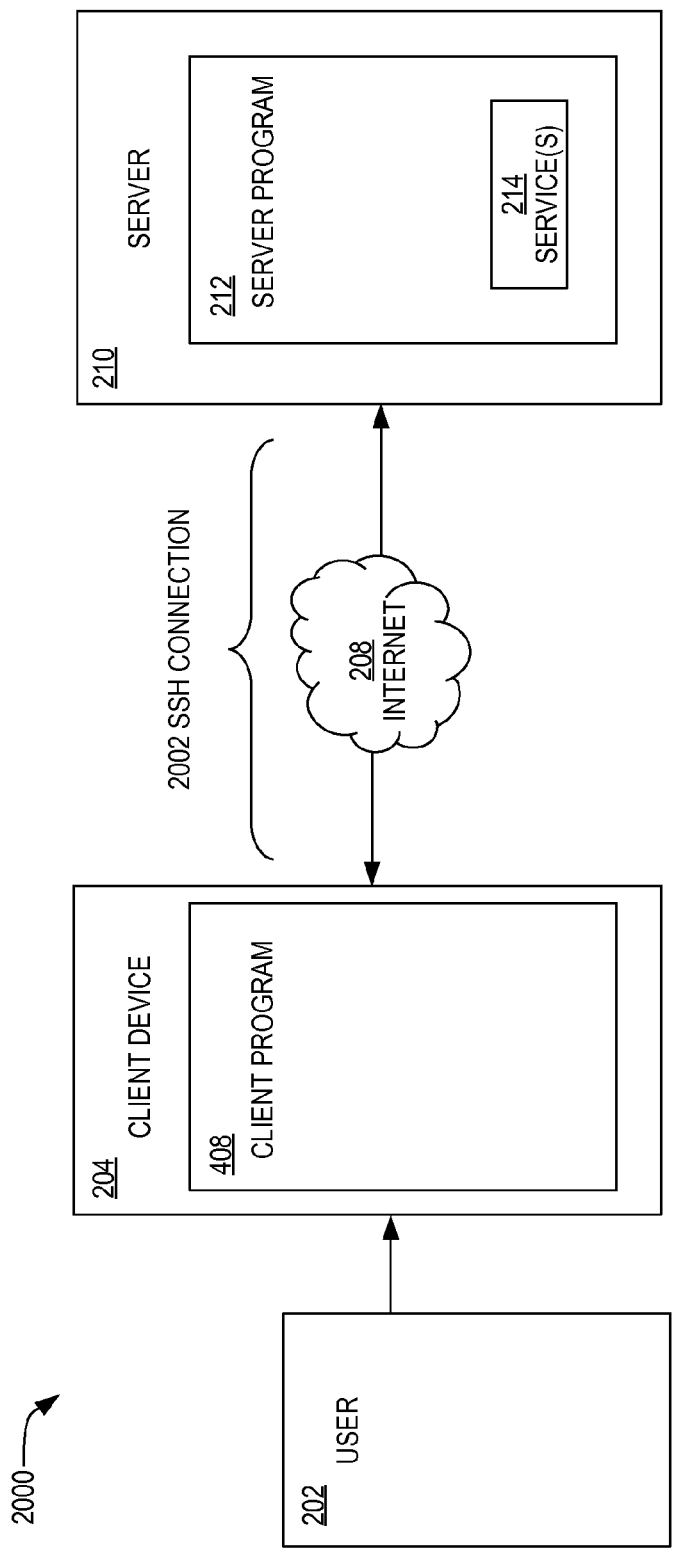
FIG. 20 shows an overview block diagram of a system in accordance with the third embodiment of the present invention with elements referenced in the flowchart of FIG. 19.

FIG. 19 shows a summary flowchart of a method 1900 in accordance with a third embodiment of the present invention; and FIG. 20 shows an overview block diagram of a system 2000 in accordance with the third embodiment of the present invention with elements referenced in the flowchart of FIG. 19.

Firstly, a user 202 and a user device 204 are authenticated 102 using a process identical to the process 102 described in the first embodiment Next, a SSH (secure shell) connection 2002 is established 1904 from the client device 204 to the server computer 210.

Next, a server program 212 authorizes 1906 the user 202 to access and use the predetermined services 214 on the server computer 210 that are available to the authenticated user 202 and authenticated client device 204.

Next, the user 202 uses 1908 the predetermined services 214 in a conventional manner.

When the user 202 is finished using the predetermined services 214, the user 202 closes 110 the SSH connection 2002. Optionally, the user 202 may repeat 1912 the connection 1904 to closing 1910 processes as many times as desired without repeating the authentication 102 process.

Figure 21:
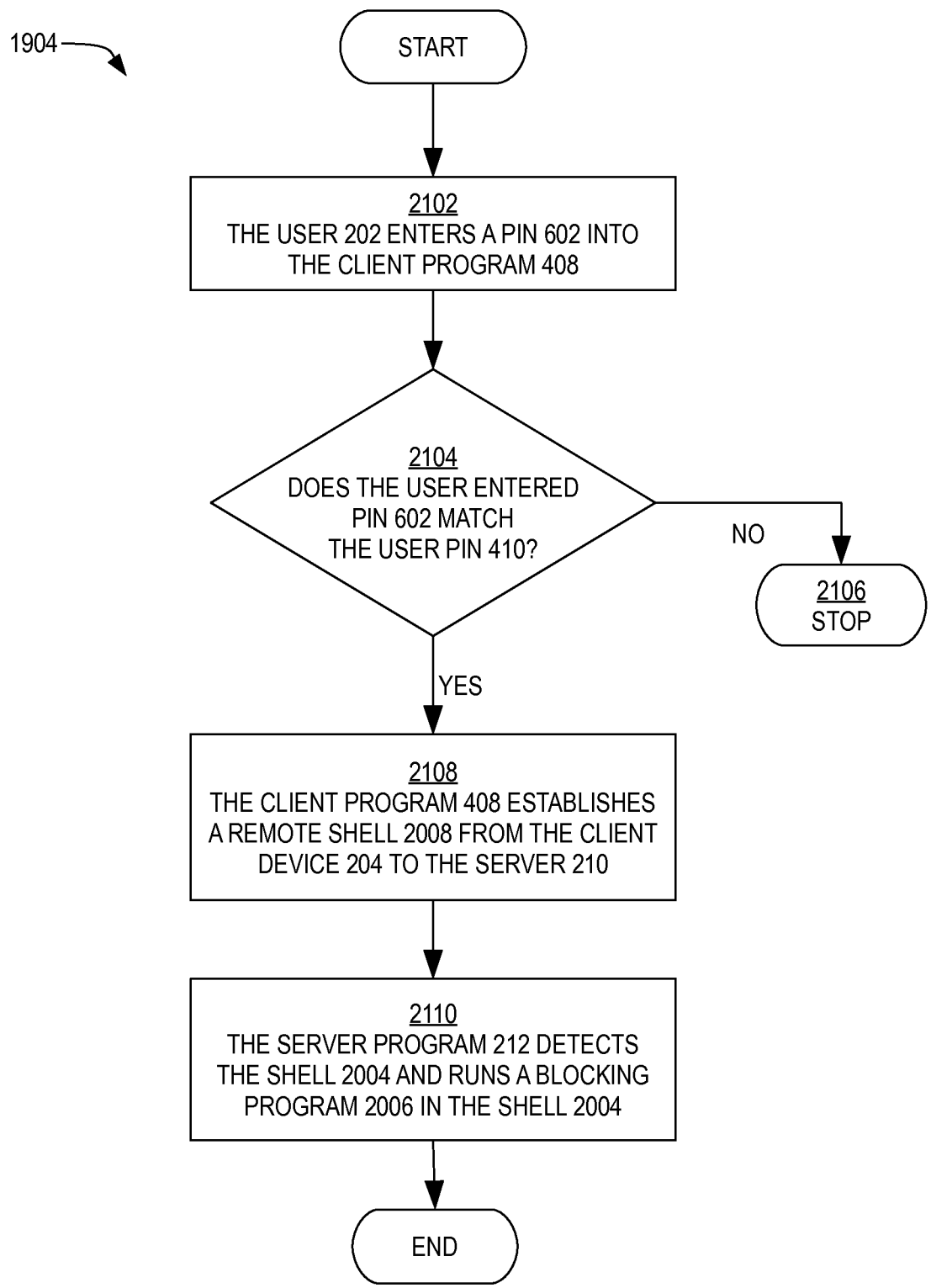
FIG. 21 shows a flowchart of a method of a connection process in the flowchart shown in FIG. 19.
Figure 22:
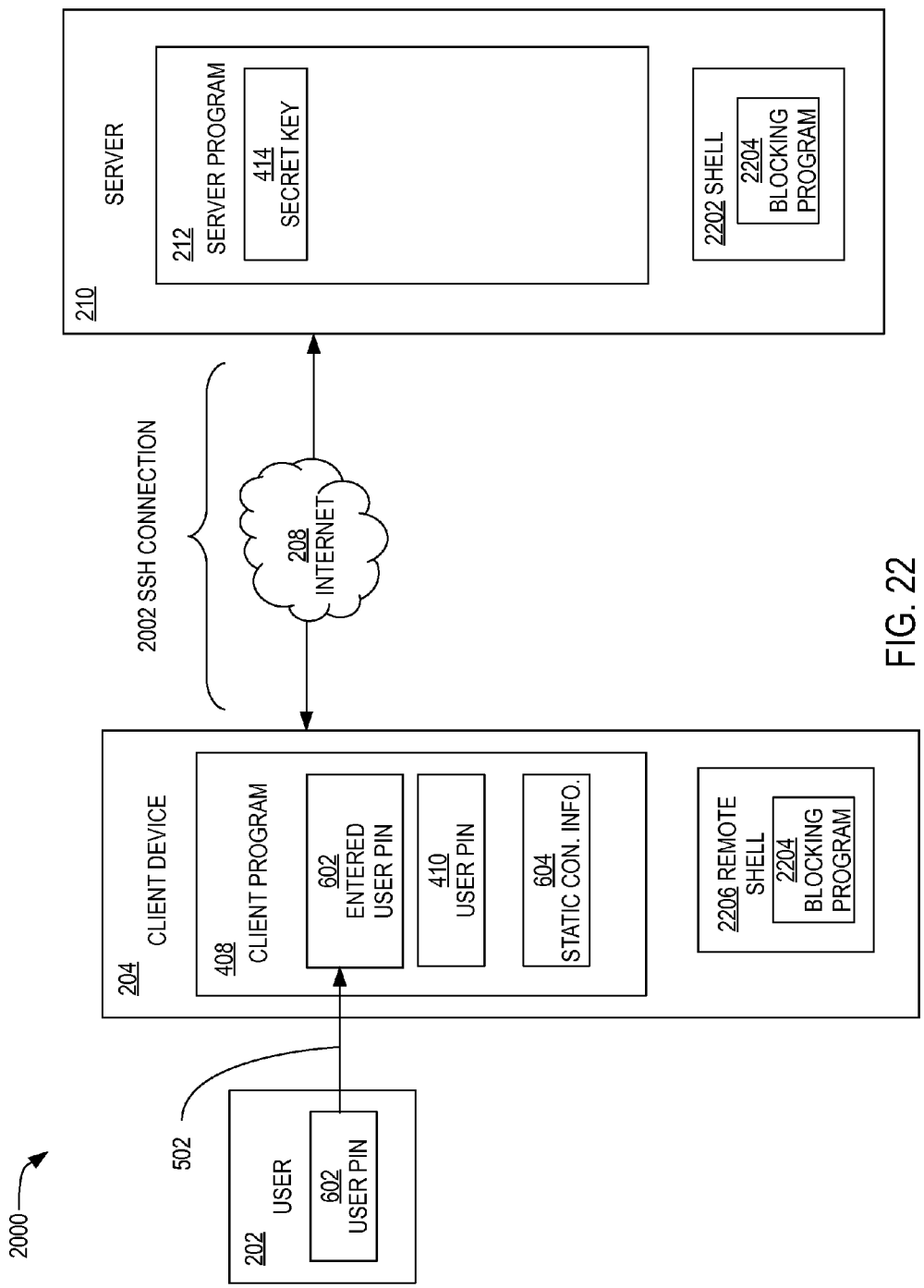
FIG. 22 shows a detailed block diagram of the system shown in FIG. 2 with elements referenced in the flowchart of FIG. 21.

FIG. 21 shows a flowchart of a method of the connection process 1904 in the flowchart shown in FIG. 19; and FIG. 22 shows a detailed block diagram of the system shown in FIG. 20 with elements referenced in the flowchart of FIG. 21.

First, the user 202 enters 2102 a PIN 602 into the client program 408. The entered user PIN 602 is compared 2104 with the predetermined user PIN 410. If the entered user PIN 602 and the predetermined user PIN 410 do no match, the connection process 1904 is stopped 2106. If the entered user PIN 602 and the predetermined user PIN 410 do match then the connection process 1904 continues.

Next, the client program 408 establishes 2108 a secure shell connection 2002 from the client device 204 to the server computer 210. The server program 212 detects 2110 the secure shell connection 2002 and a blocking program 2204 in the secure shell 2202.

Figure 23:
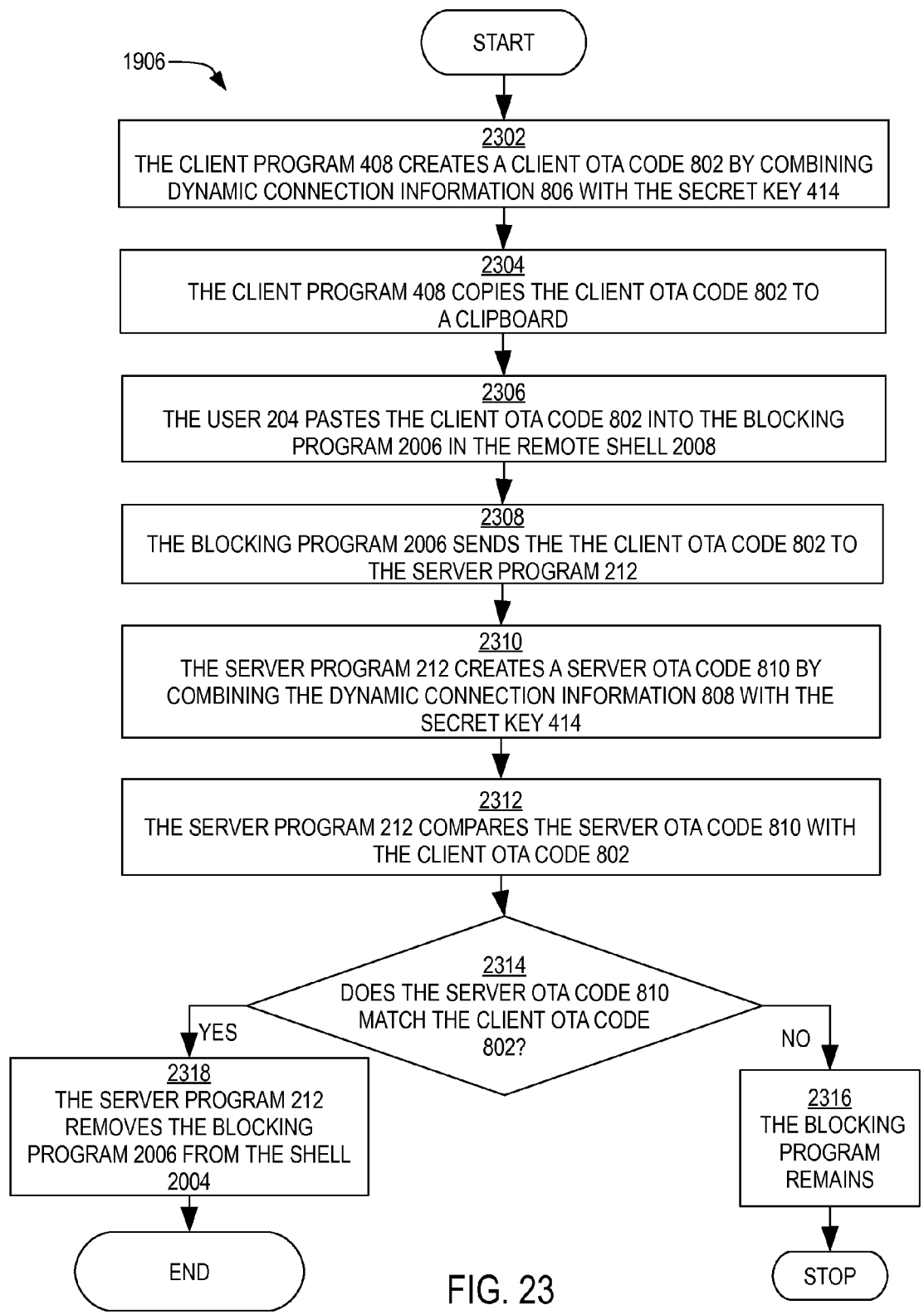
FIG. 23 shows a flowchart of a method of an authorization process in the flowchart shown in FIG. 19.
Figure 24:
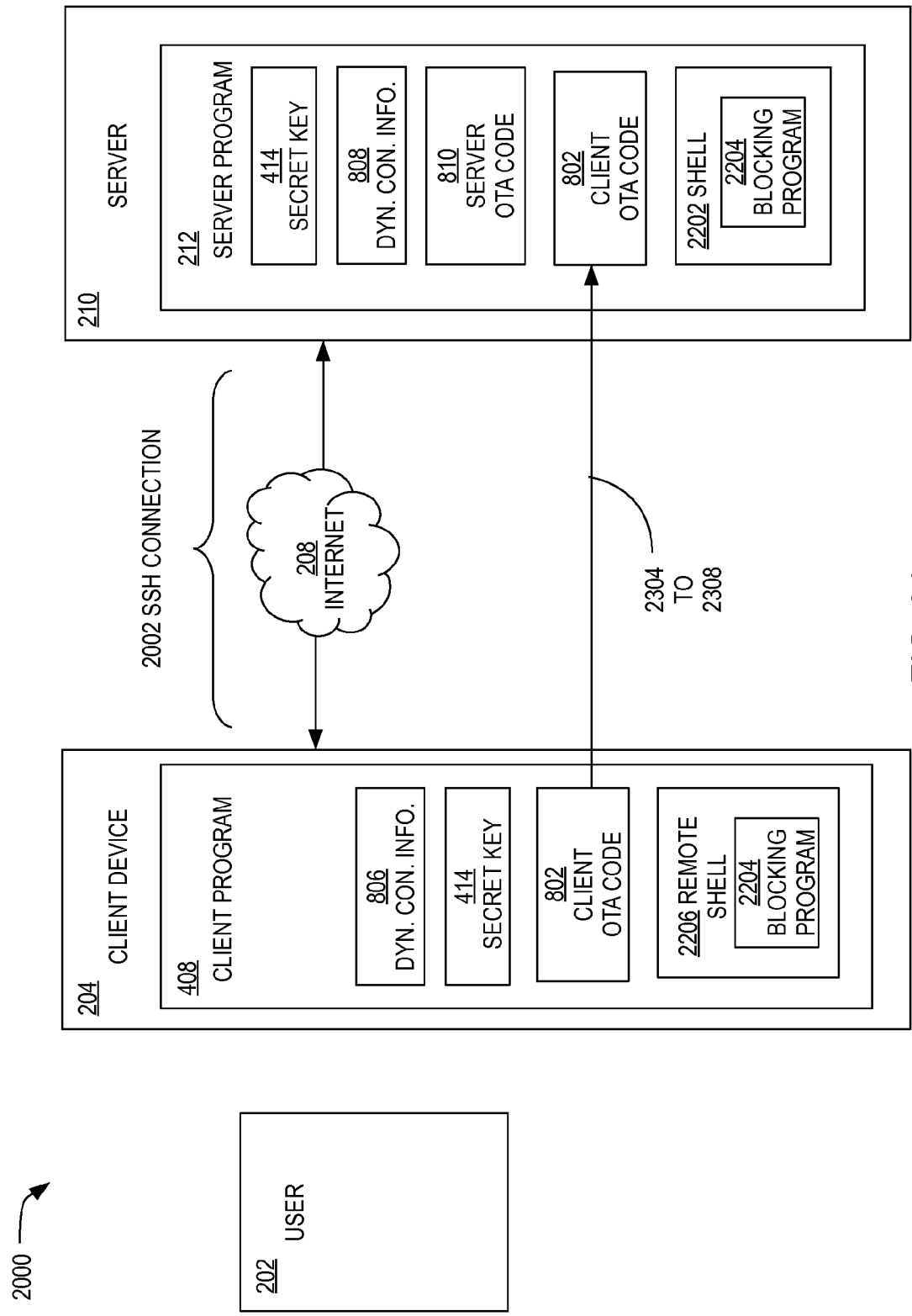
FIG. 24 shows a detailed block diagram of the system shown in FIG. 12 with elements referenced in the flowchart of FIG. 23.

FIG. 23 shows a flowchart of a method of an authorization process in the flowchart shown in FIG. 19; and FIG. 24 shows a detailed block diagram of the system shown in FIG. 20 with elements referenced in the flowchart of FIG. 23.

The authorization process for the third embodiment 1906 is substantially the same as the first embodiment 106 except that the server program 212 removes 2118 the blocking program 2204 from the secure shell 2202.

Figure 25:
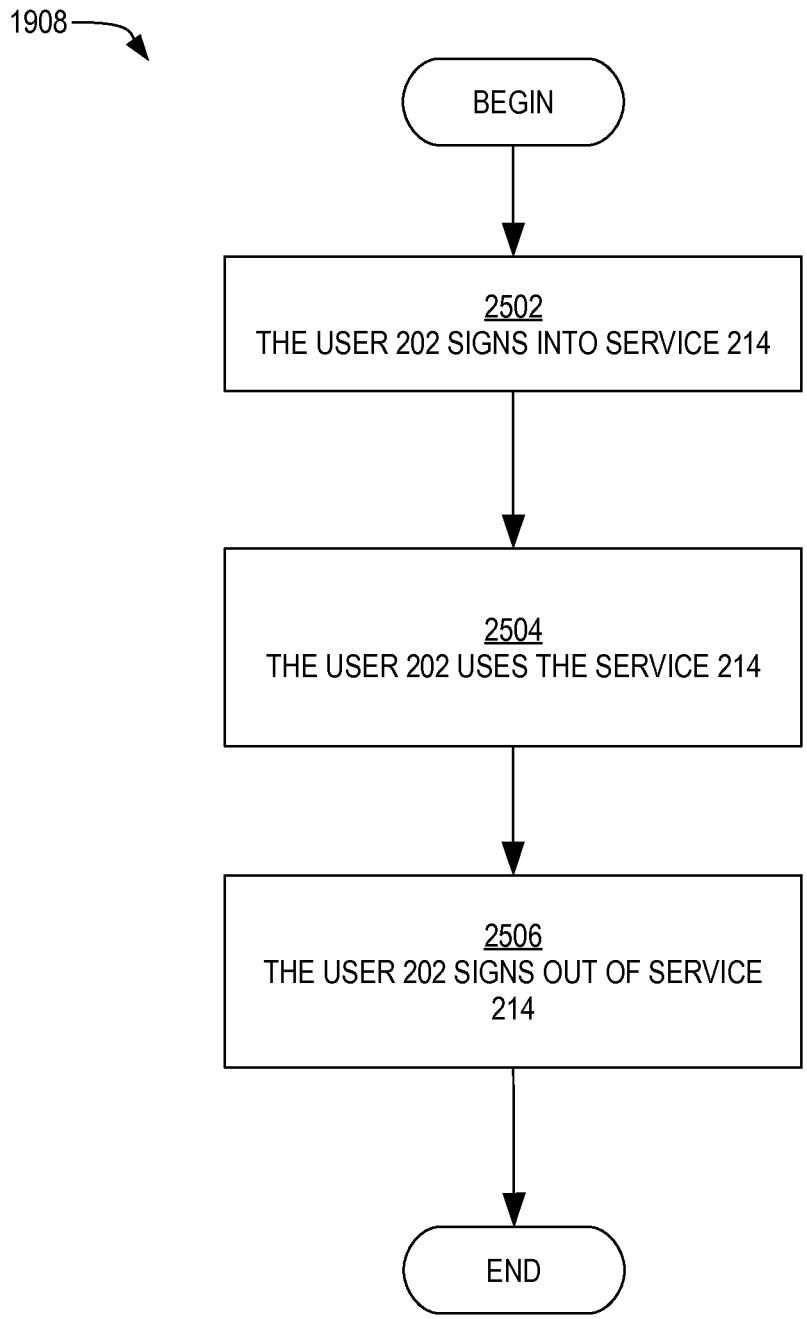
FIG. 25 shows a flowchart of a method of a Using Services process in the flowchart shown in FIG. 19.
Figure 26:
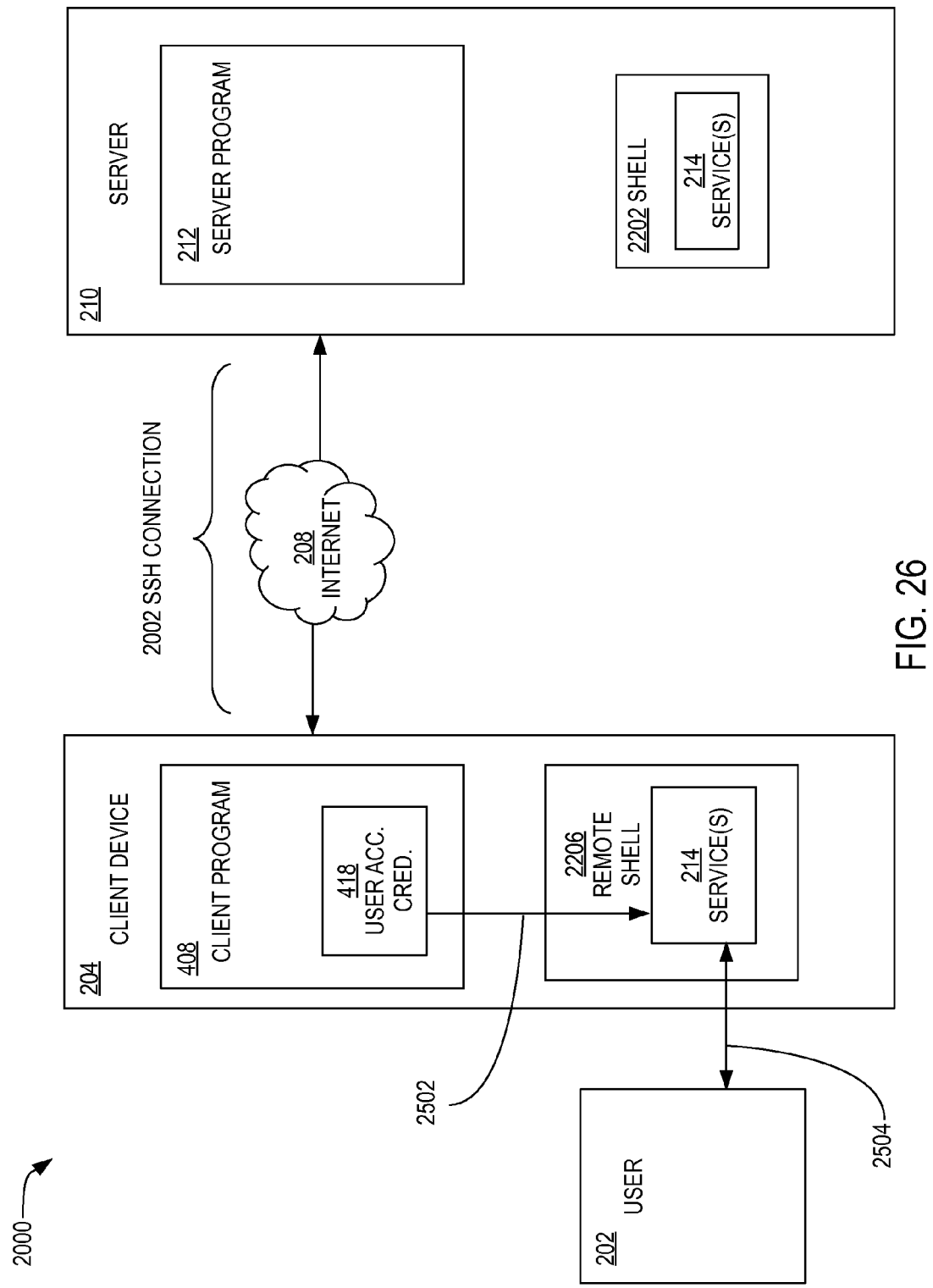
FIG. 26 shows a detailed block diagram of the system shown in FIG. 12 with elements referenced in the flowchart of FIG. 25.

FIG. 25 shows a flowchart of a method of the Using Services process in the flowchart shown in FIG. 19; and FIG. 26 shows a detailed block diagram of the system shown in FIG. 20 with elements referenced in the flowchart of FIG. 25.

First, the user 202 signs into 2502 service 214 in the remote shell 2206. The user 202 uses 2504 the service 214. The user 202 signs out 2506 of service 214.

Therefore embodiments of the present invention expand a shared environment between the client and the server elements, which require the following:

Separating the authentication process from the authorization process;

Reversing a conventional sequence of access and connection processes by establishing a connection first, so that dynamic connection link information can be used as an input for generating stronger, more secure OTA codes that are uniquely associated with the connection. This authorization process authorizes the user for a specific run-time connection that has been established, since the dynamic connection information forms part of the OTA code.

Embodiments of the present invention provide an improved authorization process for securely accessing remote computing services, such as data centers and various services based on cloud computing models, for example. Furthermore, embodiments of the present invention provide a real-time method for generating and verifying a One-Time Authorization (OTA) code. This method is based on the client program and server program sharing the static and dynamic information for generating and verifying OTA codes:

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

TABLE OF ELEMENTS

Figure 3A:
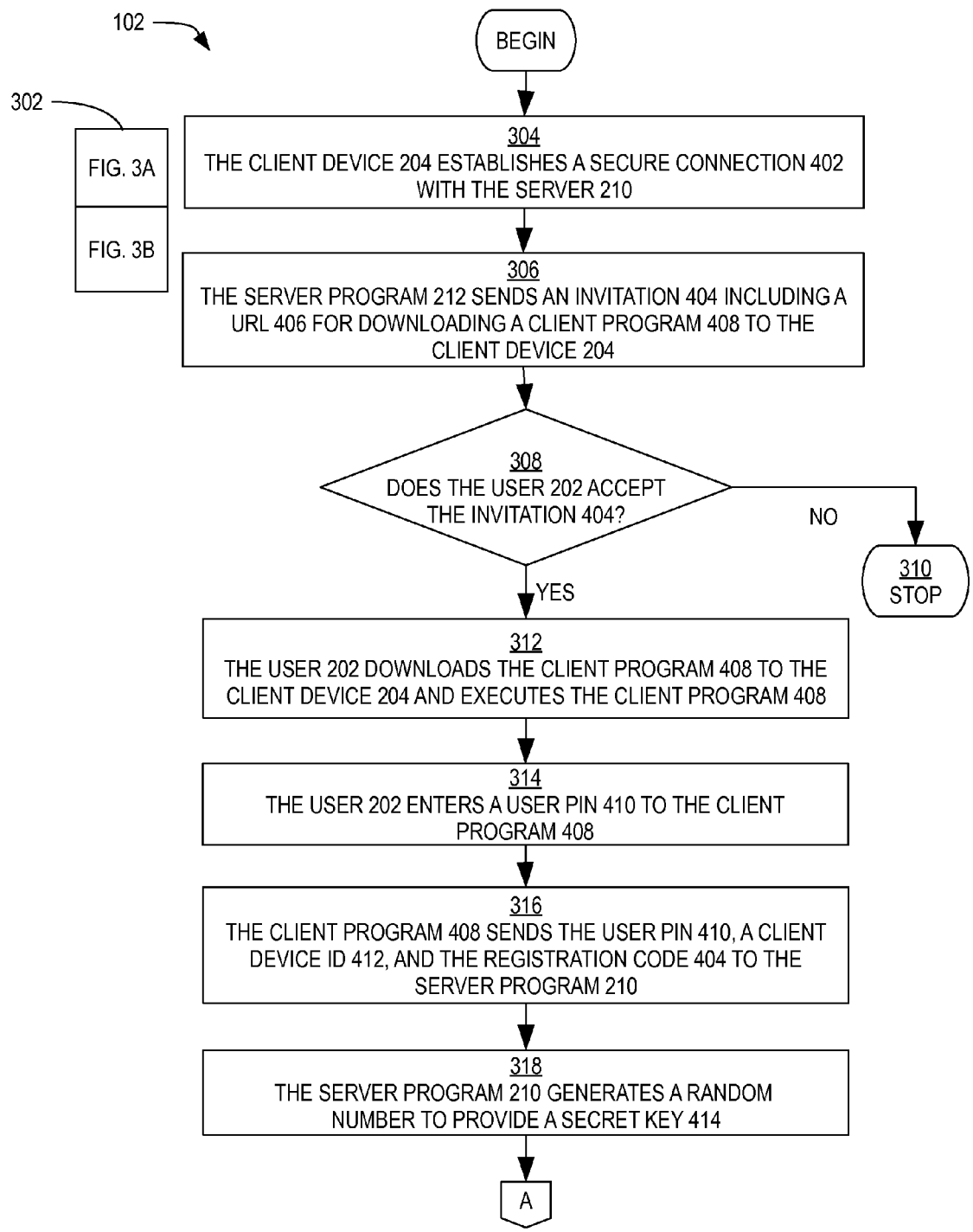
FIGS. 3A and 3B show a flowchart of a method of an authentication process in the flowchart shown in FIG. 1.
Figure 3B:
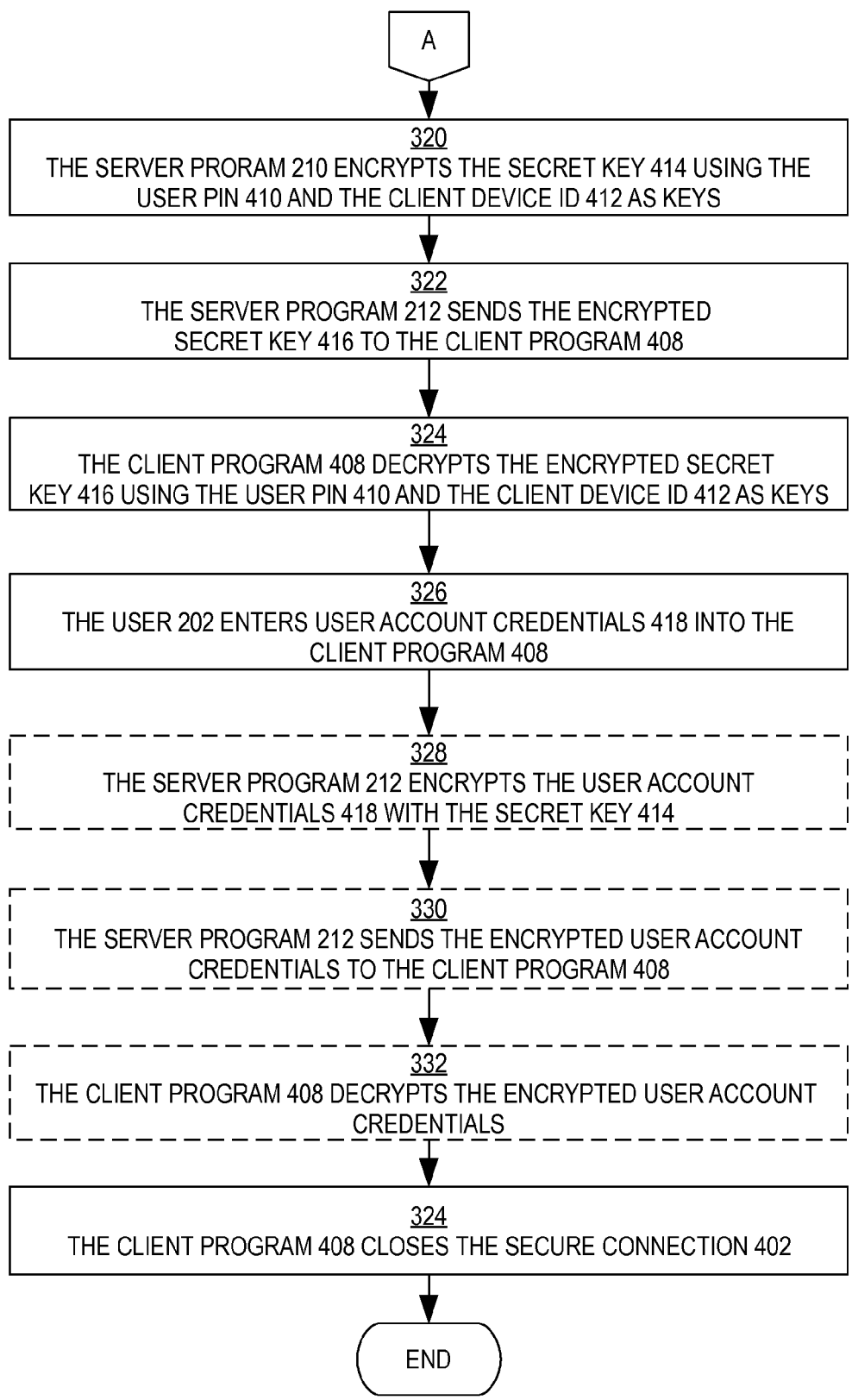

| | |
|---|---|
| 100 | Flowchart of a first embodiment |
| 102 to 112 | Processes of flowchart 100 |
| 200 | System block diagram of the first embodiment |
| 202 | User |
| 204 | Client Device |
| 206 | RDP Connection |
| 208 | Internet |
| 210 | Server Computer |
| 212 | Server Program |
| 214 | Service(s) |
| 302 | Layout guide to FIGS. 3A and 3B |
| 304 to 324 | Processes of Authentication 102 shown in FIG. 1 |
| 402 | Secure Connection |
| 404 | Invitation |
| 406 | Download URL |
| 408 | Client Program |
| 410 | Predetermined User Pin |
| 412 | Static Client Device ID |
| 413 | Client device ID (copy) |
| 414 | Secret Key |
| 416 | Encrypted Secret Key |
| 418 | User Account Credentials |
| 502 to 510 | Processes of Connection 104 shown in FIG. 1 |
| 602 | Entered User PIN |
| 604 | Static Connection Information |
| 606 | Blocking Window |
| 608 | Server Desktop |
| 610 | Remote Desktop |
| 702 to 718 | Processes of Authorization 106 shown in FIG. 1 |
| 802 | Client OTA Code |
| 804 | Client Dynamic Connection Information |
| 806 | Shared Clipboard |
| 808 | Server Dynamic Connection Information |
| 810 | Server OTA Code |
| 902 to 906 | Processes of Using Services 108 shown in FIG. 1 |
| 1100 | Flowchart of a second embodiment |
| 102, 1104 to 1112 | Processes of flowchart 1100 |
| 1200 | System block diagram of the second embodiment |
| 1202 | Client terminal |
| 1302 to 1314 | Processes of connection 1104 shown in FIG. 11 |
| 1402 | QR code |
| 1502 to 1516 | Processes of authorization 1106 shown in FIG. 11 |
| 1602 | Authorization channel |
| 1702 to 1706 | Processes of Using Services 1108 shown in FIG. 11 |
| 1900 | Flowchart of a third embodiment |
| 102, 1904 to 1912 | Processes of flowchart 1900 |
| 2000 | System block diagram of the third embodiment |
| 2002 | Secure shell connection |
| 2102 to 2110 | Processes of connection 1904 shown in FIG. 19 |
| 2202 | Shell |
| 2204 | Blocking program |
| 2206 | Remote shell |
| 2302 to 2318 | Processes of authorization 1906 shown in FIG. 19 |
| 2502 to 2506 | Processes of using 1908 show in FIG. 19 |

Thus, an improved system, method and apparatus for secure remote connection to computing services have been provided.

Although the embodiments of the invention have been described in detail, it will be apparent to one skilled in the art that variations and modifications to the embodiment may be made within the scope of the following claims.

What is claimed is:

1. A method for remote secure access of a user to a service on a server computer, the method comprising:
 (a) at a client device, obtaining, from the server computer or a third party server computer, an authorization software and an input information to the authorization software;
 (b) separating authentication and authorization processes, comprising excluding service access privileges from the authenticating process and transferring the privileges to the authorization process, comprising:
  (i) authenticating at least one of:

a user; or the user and the client device, comprising:
verifying identity thereof, without providing the access of the user to the service;
(ii) upon successful authenticating, authorizing access of the user to the service, comprising:
(ii-1) establishing an authorization connection between the client device and the server computer;
(ii-2) at the server computer, detecting the authorization connection, and creating a blocking process to block access of the user to the service on the server computer;
(ii-3) executing the authorization software on the client device and the server computer or the third party server computer with the input information obtained in the step (a); and
(ii-4) provided an output from the authorization software on the client device and the server computer or the third party server computer is the same, terminating the blocking process on the server computer, thereby allowing the access of the user to the service on the service computer.

2. The method of claim 1, wherein the authorization software is configured to perform a One-Time-Authorization (OTA).

3. The method of claim 2, wherein the OTA is performed using a one-way function.

4. The method of claim 2, wherein the OTA is performed using a dynamic connection information for the authorization connection as the input information.

5. The method of claim 1, wherein the establishing the authorization connection comprises establishing a remote desktop connection.

6. The method of claim 1, wherein the creating the blocking process further comprises creating a blocking window on a desktop of the server computer.

7. The method of claim 6, wherein the creating the blocking window further comprises creating a modal dialog window.

8. The method of claim 1, further comprising:
providing a quick response (QR) code including a dynamic connection information for the authorization connection in a blocking window on the server computer; and
at the client device, obtaining the dynamic connection information from the QR code.

9. The method of claim 1, further comprising one or more of the following:
sharing the output from the authorization software on the client device and the server computer or the third party server computer via a shared clipboard; or
sending the output from the authorization software on the client device to the server computer or the third party server computer via a secure channel; or
copying the output from the authorization software on the client device to a clipboard, and pasting said output into a secure shell executing the blocking process.

10. The method of claim 1, further comprising:
using the service; and
closing the authorization connection on the server computer.

11. The method of claim 10, wherein the using the service further comprises:
automatically signing into the service in a remote desktop window on the client device using user account credentials; and
the user signing out of the service in the remote desktop window on the client device.

12. A system for remote secure access of a user to a service on a server computer, the system comprising:
a client device having a processor;
a server computer; and
computer readable instructions stored in a memory of the client device and the server computer, causing:
(a) the client device to obtain, from the server computer or a third party server computer, an authorization software and an input information to the authorization software;
(b) the server computer and the client device to separate authentication and authorization processes, comprising excluding service access privileges from the authenticating process and transferring the privileges to the authorization process, comprising:
(i) authenticating at least one of:
a user; or the user and the client device, comprising:
verifying identity thereof, without providing the access of the user to the service;
(ii) upon successful authenticating, authorizing access of the user to the service, comprising:
(ii-1) establishing an authorization connection between the client device and the server computer;
(ii-2) at the server computer, detecting the authorization connection, and creating a blocking process to block access of the user to the service on the server computer;
(ii-3) executing the authorization software on the client device and the server computer or the third party server computer with the input information obtained in the step (a); and
(ii-4) provided an output from the authorization software on the client device and the server computer or the third party server computer is the same, terminating the blocking process on the server computer, thereby allowing the access of the user to the service on the service computer.

13. The system of claim 12, wherein the authorization software is configured to perform a One-Time-Authorization (OTA).

14. The system of claim 13, wherein the OTA is performed using a one-way function.

15. The system of claim 13, wherein the OTA is performed using a dynamic connection information for the authorization connection as the input information.

16. The system of claim 12, wherein the the authorization connection comprises a remote desktop connection.

17. The system of claim 12, wherein the blocking process comprises a blocking window on a desktop of the server computer.

18. The system of claim 6, wherein the blocking window comprises a modal dialog window.

19. The system of claim 12, wherein the computer readable instructions further cause the server computer to form a quick response (QR) code including a dynamic connection information for the authorization connection in a blocking window on the server computer, and the client device to obtain the dynamic connection information from the QR code.

20. The system of claim 12, wherein the computer readable instructions further cause the server computer and the client device to perform one or more of the following:
to share the output from the authorization software on the client device and the server computer or the third party server computer via a shared clipboard; or
to send the output from the authorization software on the client device to the server computer or the third party server computer via a secure channel; or
to copy the output from the authorization software on the client device to a clipboard, and to paste said output into a secure shell executing the blocking process.

21. The system of claim 12, wherein the computer readable instructions further cause the server computer to close the authorization connection upon the user using the service.

22. The system of claim 12, wherein the computer readable instructions further cause the client device to automatically sign into the service in a remote desktop window using user account credentials.

\* \* \* \* \*